United States Patent
Ohm et al.

(10) Patent No.: US 10,217,001 B2
(45) Date of Patent: Feb. 26, 2019

(54) VIDEO OBJECT DATA STORAGE AND PROCESSING SYSTEM

(71) Applicant: KickView Corporation, Greenwood Village, CO (US)

(72) Inventors: David R. Ohm, Longmont, CO (US); Robert L. North, Centennial, CO (US); Kyle A. Muchmore, Longmont, CO (US)

(73) Assignee: KickView Corporation, Greenwood Village, CO (US)

( * ) Notice: Subject to any disclaimer, the term of this patent is extended or adjusted under 35 U.S.C. 154(b) by 0 days.

(21) Appl. No.: 15/487,430

(22) Filed: Apr. 13, 2017

(65) Prior Publication Data

US 2017/0300754 A1    Oct. 19, 2017

Related U.S. Application Data

(60) Provisional application No. 62/322,465, filed on Apr. 14, 2016.

(51) Int. Cl.
  *G06K 9/00* (2006.01)
  *G06K 9/66* (2006.01)
  *G06K 9/62* (2006.01)

(52) U.S. Cl.
  CPC ....... *G06K 9/00718* (2013.01); *G06K 9/6227* (2013.01); *G06K 9/66* (2013.01)

(58) Field of Classification Search
  USPC ....................................................... 382/103
  See application file for complete search history.

(56) References Cited

U.S. PATENT DOCUMENTS

| 9,977,991 B2 * | 5/2018 | Chu | G06F 17/3028 |
| 2005/0073585 A1 * | 4/2005 | Ettinger | H04N 7/18 348/155 |
| 2006/0053342 A1 * | 3/2006 | Bazakos | G06K 9/00335 714/37 |
| 2007/0058836 A1 * | 3/2007 | Boregowda | G06K 9/00771 382/103 |
| 2008/0181453 A1 * | 7/2008 | Xu | G06T 7/215 382/103 |
| 2008/0239078 A1 * | 10/2008 | Mohr | G06T 7/0042 348/148 |
| 2013/0223726 A1 * | 8/2013 | Jiang | G06K 9/6287 382/159 |
| 2015/0031848 A1 * | 1/2015 | Honcoop | G08G 63/08 528/80 |
| 2015/0206441 A1 * | 7/2015 | Brown | G09B 5/00 434/308 |
| 2016/0148077 A1 * | 5/2016 | Cox | G06K 9/00288 382/159 |
| 2016/0162497 A1 * | 6/2016 | Cho | G06F 17/3079 386/241 |
| 2016/0180195 A1 * | 6/2016 | Martinson | G06K 9/6256 382/103 |
| 2017/0268896 A1 * | 9/2017 | Bai | G01C 21/36 |
| 2017/0270674 A1 * | 9/2017 | Shrivastava | G06K 9/00771 |

(Continued)

*Primary Examiner* — Jerome Grant, II
(74) *Attorney, Agent, or Firm* — Neugeboren O'Dowd PC

(57) ABSTRACT

A video object data storage and display system comprising a video object data selection and viewing portion and a video object data storage portion. The system comprises a video object having a: scale/size, pose/tilt, location, and frame/time. The system further comprises a database.

14 Claims, 17 Drawing Sheets

(56) References Cited

U.S. PATENT DOCUMENTS

| | | | | |
|---|---|---|---|---|
| 2017/0300754 A1* | 10/2017 | Ohm | ............ | G06K 9/00718 |
| 2017/0308753 A1* | 10/2017 | Wu | ............ | G06K 9/00744 |
| 2018/0068198 A1* | 3/2018 | Savvides | ............ | G06K 9/3233 |
| 2018/0089515 A1* | 3/2018 | Yang | ............ | G06K 9/6274 |
| 2018/0121762 A1* | 5/2018 | Han | ............ | G06K 9/4604 |
| 2018/0122114 A1* | 5/2018 | Luan | ............ | G06T 7/194 |
| 2018/0157916 A1* | 6/2018 | Doumbouya | ............ | G06K 9/00771 |
| 2018/0159979 A1* | 6/2018 | Amir | ............ | H04M 3/5183 |
| 2018/0165518 A1* | 6/2018 | Assaf | ............ | G06K 9/00671 |
| 2018/0165934 A1* | 6/2018 | Pan | ............ | G06K 9/00718 |
| 2018/0173960 A1* | 6/2018 | Laska | ............ | G06K 9/00711 |
| 2018/0174046 A1* | 6/2018 | Xiao | ............ | G06N 3/08 |
| 2018/0210536 A1* | 7/2018 | Messely | ............ | G06F 1/3231 |
| 2018/0211396 A1* | 7/2018 | Roshtkhari Javan | ... | G06T 7/248 |

* cited by examiner

VIDEO OBJECT DATA STORAGE AND PROCESSING SYSTEM

PRIORITY OF THE INVENTION

This application claims priority to U.S. Provisional Application No. 62/322,465, entitled "Video Processing System," filed Apr. 14, 2016, and incorporated herein by reference in its entirety.

FIELD OF THE INVENTION

This application relates to a digital video system. In particular, but not intended to limit the invention, this disclosure is related to the selection, identification, and storage of data related to objects within a video stream.

BACKGROUND OF THE INVENTION

As the use of digital communications has increased, the creation and use of digital videos has likewise increased. Now commonplace in digital advertising, entertainment, and communication, current digital video systems fail to provide the user the ability to interact with the video and fail to provide adequate video data storage techniques. For example, current video viewing platforms only provide a user with the ability to view various portions of the video and the data storage requirements for video systems limit their effectiveness.

SUMMARY OF THE INVENTION

In order to provide video creators, viewers, and managers with the ability to better interact with videos, a video data object storage and processing system has been created. One embodiment of such an invention comprises a video processing system. The video processing system may comprise an end-user device displaying one or more sections of video. The one or more sections of video comprise one or more video objects. The processing system may further comprise one or more video object storing devices. Information related to the one or more video objects may be located on the one or more video object storing devices. Additional devices in the system may comprise one or more object classification devices. The one or more classification devices may implement a neural network to recognize and identify the one or more video objects. A communication control device may also be included to process communications between the end-user device, one or more video object storing devices, and one or more classification devices.

Another embodiment of the invention may comprise a method of identifying a video object. One such method may comprise selecting at least one video object in at least one frame of an identified video. At least one of a first classification device and a second classification device may be used to recognize the at least one video object. The first classification device may comprise a first neural network having a first network structure and a first algorithm. The second classification device may comprise a second neural network having second network structure and a second algorithm. The method may further comprise associating the at least one recognized video object with at least one word. Furthermore, the at least one word may be related to at least one feature of the at least one recognized video object.

Yet another embodiment of the invention may comprise a video object data storage and display system. One such storage and display system comprises a video object data selection portion and a video object data storage portion. The video object data selection portion may comprise data related to a video object scale, a video object pose, a video object location, and a video object frame. The video object storage portion may comprise a database.

And yet another embodiment of the invention may comprise a non-transitory, tangible processor readable storage medium, encoded with processor executable code to perform a method for storing the location of an object through the scene of a video. One such method may comprise obtaining an object location for a plurality of video frames and enclosing the object in the plurality of video frames with a geometric shape. The method further comprises obtaining parameters related to the geometric shape for the plurality of video frames. The method yet further comprises using at least some of the parameters for at least two of the plurality of video frames to obtain the object location for another video frame.

BRIEF DESCRIPTION OF THE DRAWINGS

Various advantages and a more complete understanding of numerous embodiments of the invention are apparent and more readily appreciated by reference to the following Detailed Description and to the appended claims when taken in conjunction with the accompanying Drawings wherein:

DETAILED DESCRIPTION

Figure 1:
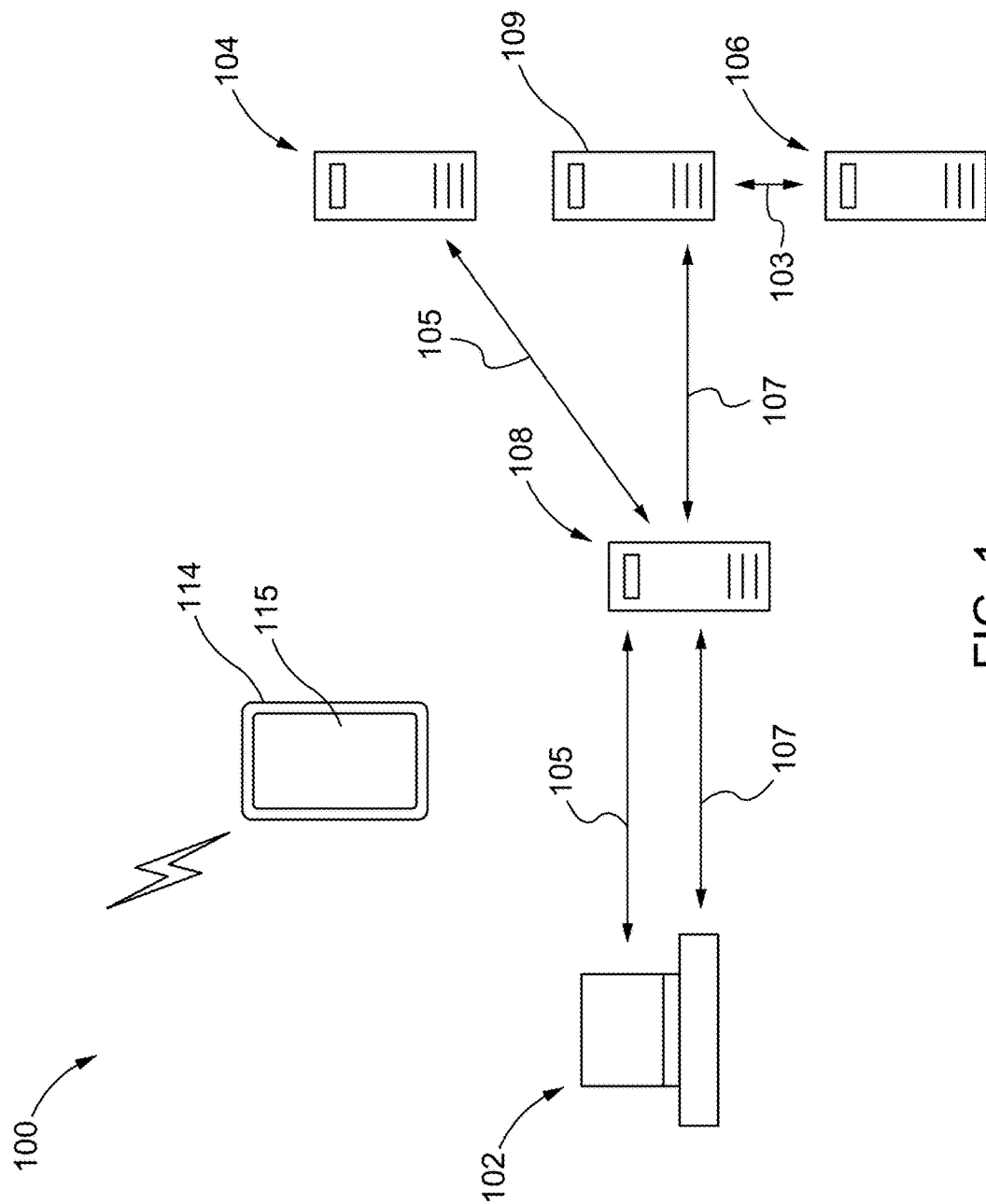
FIG. 1 depicts a video object data storage and processing system according to one embodiment of the invention.

Turning first at FIG. 1, seen is one example of a video processing system 100. One such video processing system 100 comprises an end-user device 102, one or more video object storing devices 104, one or more object classification devices 106, and at least one communication control device 108. It is contemplated that each of the devices 102, 104, 106, 108 seen in FIG. 1, as well as any other device or any other computing portion of a system discussed herein, such as, but not limited to the video processing system 100, may comprise at least a portion of one or more computing devices as described with reference to FIG. 11. Furthermore, statements herein with reference to "an embodiment" or "one embodiment" and any other similar terms or phrases are used to describe and/or refer to any embodiment, are not used to limit the statements to any particular embodiment. Such statements should be applied globally to all embodiments, where appropriate.

Figure 2:
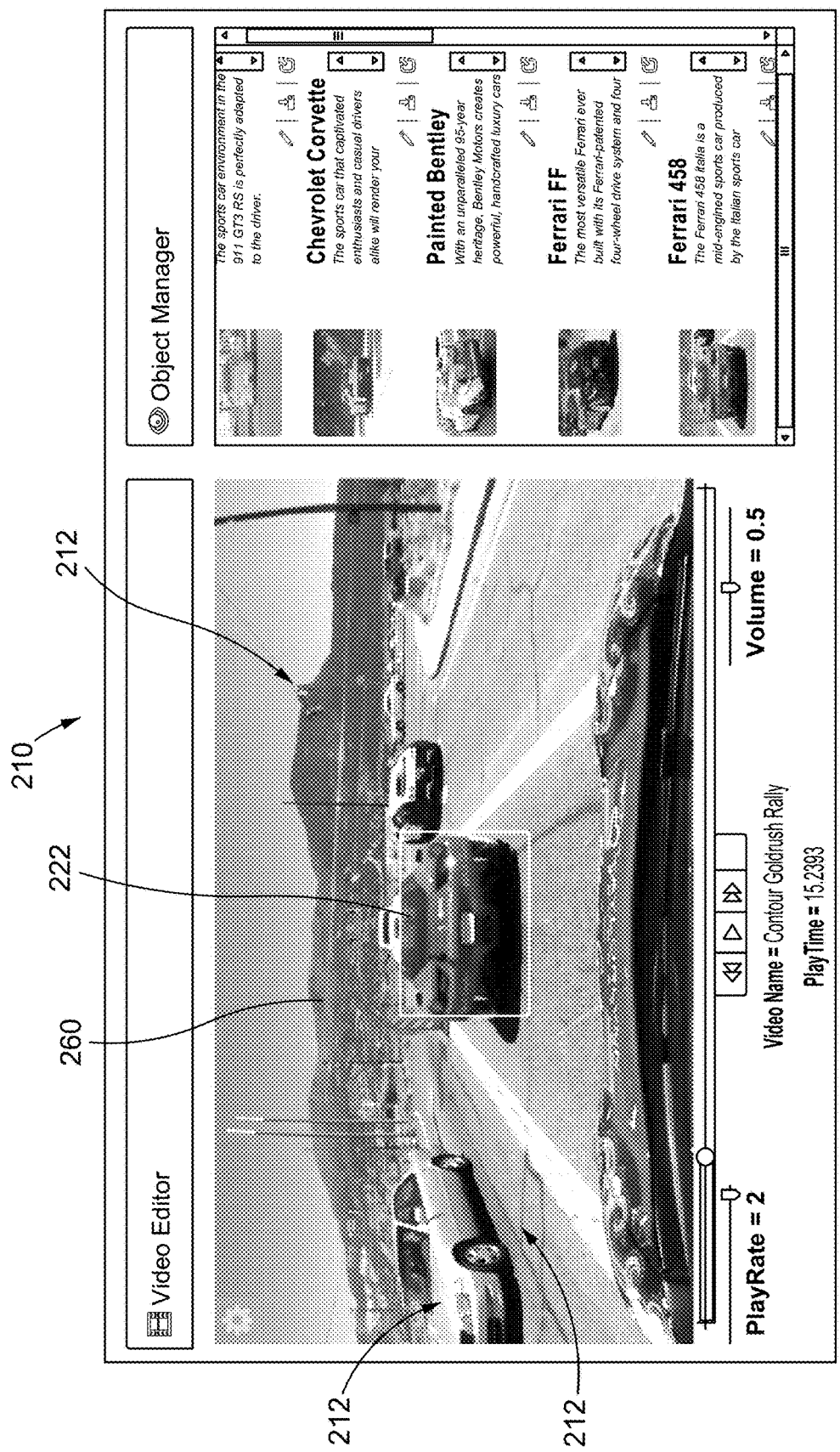
FIG. 2 depicts a video clip and object manager display according to one embodiment of the invention.

Seen in FIG. 2 is one display 210 that may be seen on a display screen at the end-user device 102 seen in FIG. 1. Seen in the display 210 is a frame of a video. The video may comprise one or more sections of video and may comprise one or more video objects 212, which may also be referred herein as an object 212. Any feature in the displayed in a video frame may comprise one of the one or more video objects 212. In the display 210 seen in FIG. 2, such objects may comprise mountains, roads, stoplights, etc. The objects may further comprise one or more features of these objects such as, but not limited to, the color of the object 212 or a description of the object's movement—e.g., driving, windy, etc. It is also contemplated an object 212 may comprise a person, an animal, an activity, a motion, an object, and/or an event. Information related to the one or more video objects 212 may reside on one of the one or more video object storing devices 104 seen in FIG. 1. Such information may be requested and provided through communications 105 between the end-user device 102 and the at least one communication device 108, and the at least one communication device 108 and the, one or more video object storing devices 104.

Figure 3:
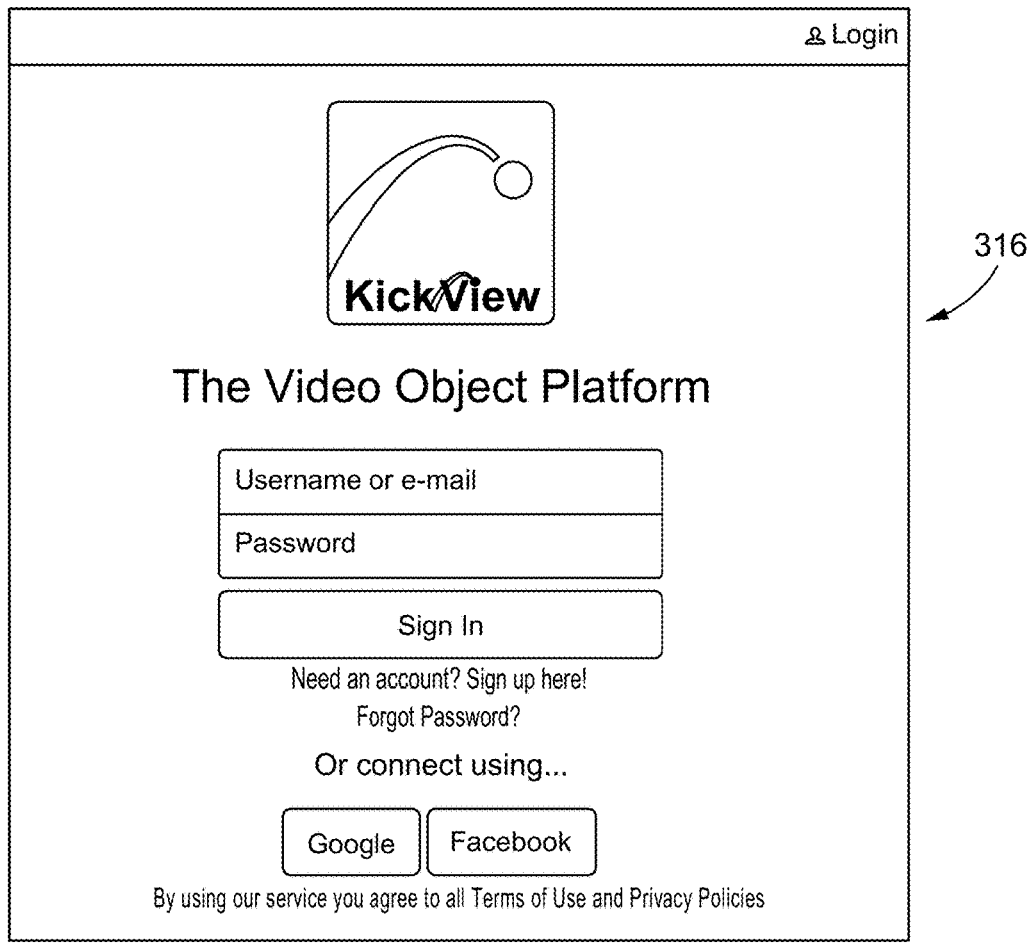
FIG. 3 depicts a login screen according to one embodiment of the invention.
Figure 4:
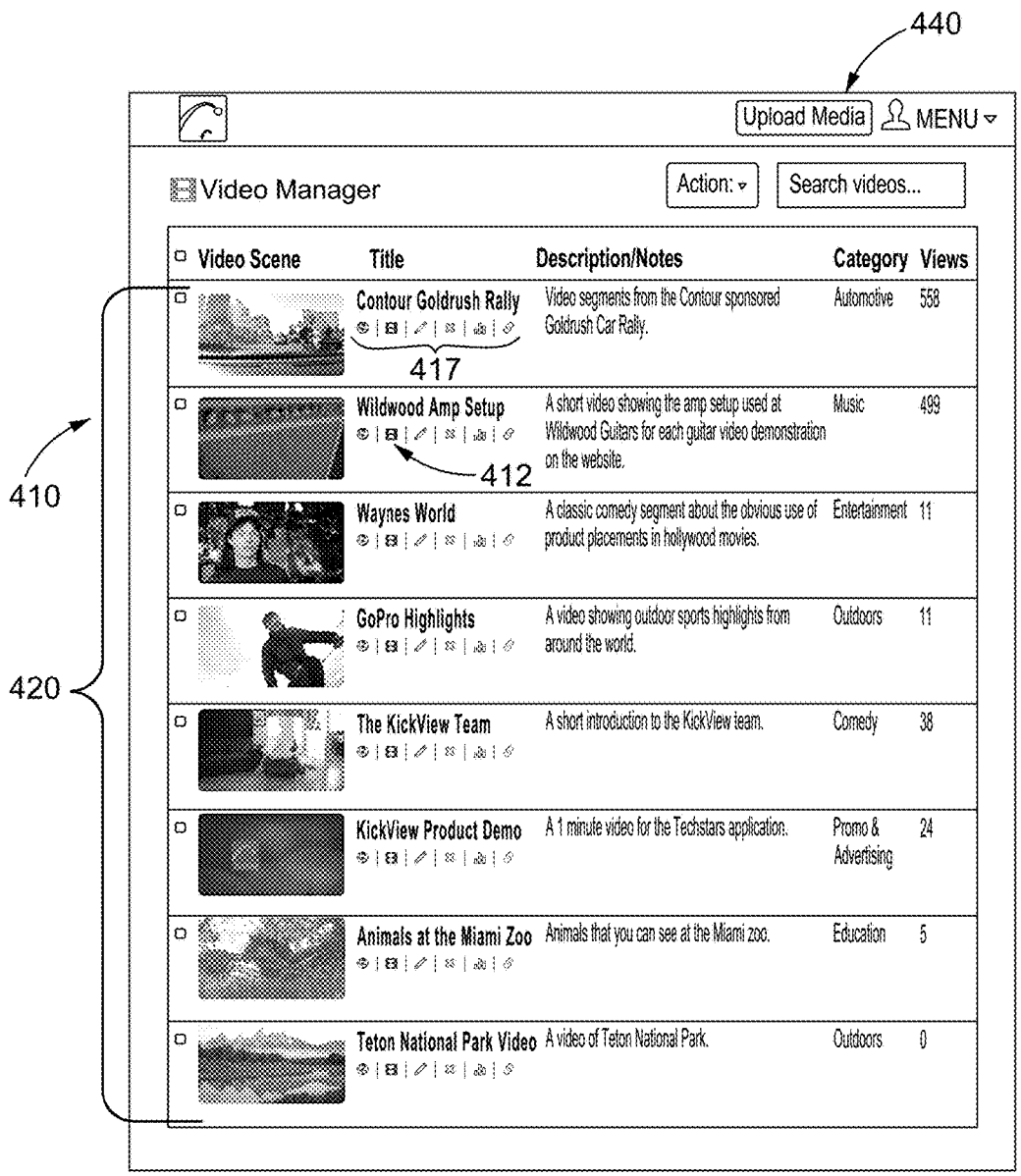
FIG. 4 depicts a video manager screen according to one embodiment of the invention.
Figure 5:
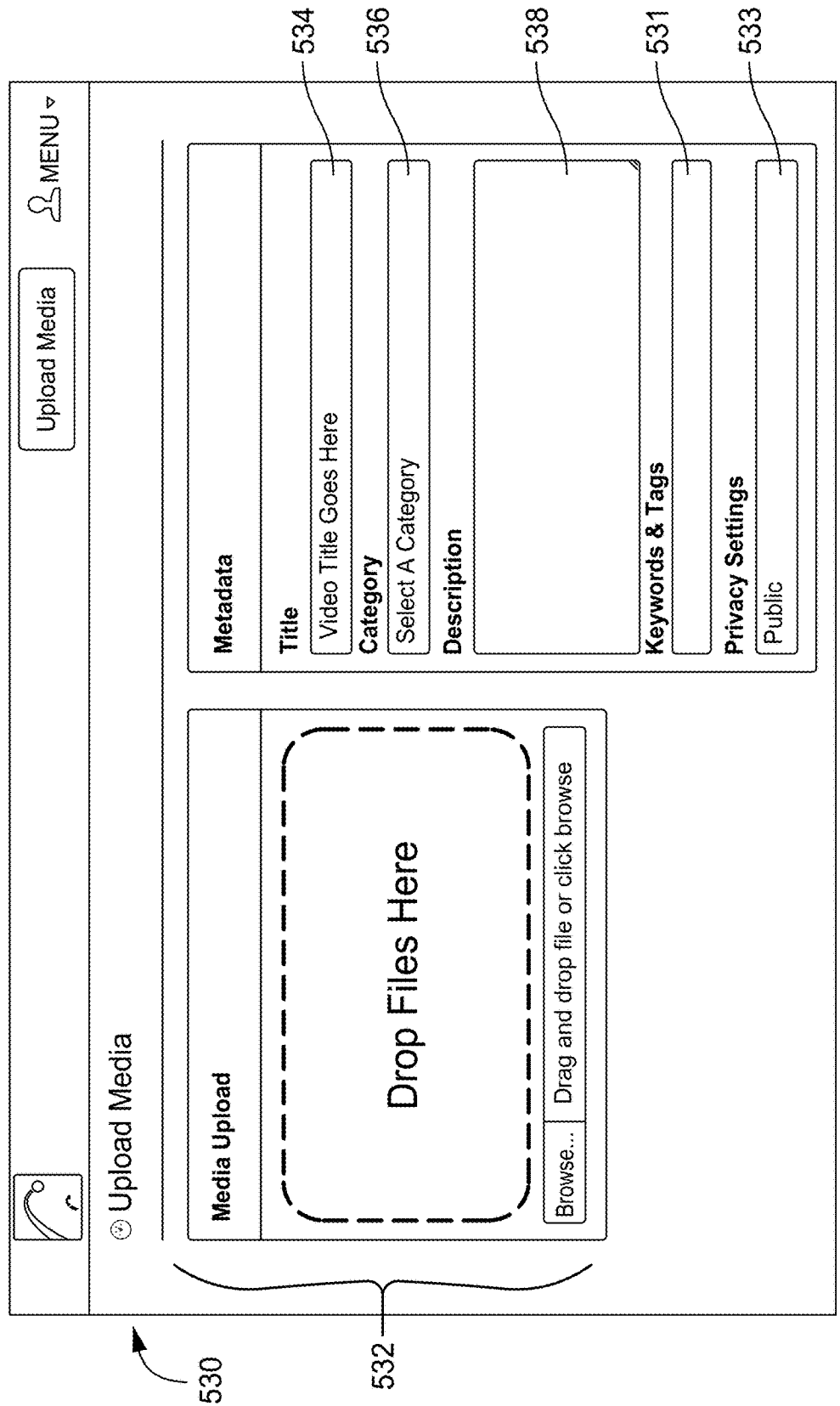
FIG. 5 depicts a media description screen according to one embodiment of the invention.

The end-user device 102 may comprise a video editing device implemented to help associate object data with the video objects 212. The end-user device 102 may also comprise a video display device used to view video clips. In either scenario, a login screen 316, as seen in FIG. 3, may be used to access a video object platform. The video object platform may reside, at least in part, on the at least one communication control device 108. However, at least a part of the video object platform may also reside on any other device seen in FIG. 1, and/or any other figure, or as described herein. The video object platform may be referred to herein as a video processing platform, video processing system 100, a video object data storage and processing system, and/or a video object data storage and display system. To access the features associated with the video processing platform, a registered user may be required to enter a username and password into the login screen 316 or, if the user is not currently registered with the platform, sign up for an account. Once the user has entered a valid username/password and accesses the system, the user may be presented with a video manager screen 410, as seen in FIG. 4. Seen in the video manager screen in FIG. 4 are a plurality of video clips 420. To add video clips to the platform, a user may access a video upload screen 530, as seen in FIG. 5. For example, a user may select the upload media selection 440 in FIG. 4 to launch the FIG. 5 video upload screen 530. It is contemplated that the video upload screen 530 and all other screens described herein may be accessed through a web browser, or mobile application, and may comprise a static HTML load and JavaScript code. Other web page and user interface/markup languages are also contemplated.

Upon displaying the video upload screen 530, a user may select a video or other media file to upload through the media upload portion 532 of the screen. A user may also associate metadata with the uploaded video clip. For example, a title 534 and a category 536 (e.g., adventure, music, sports, etc.) may be selected for the uploaded video. A description 538, keywords/tags 531, and a privacy setting 533 may also be applied to the video. Such information may be stored in one or more of the devices seen in FIG. 1. For example, this information may be stored in the one or more video object storing devices 104, as described above. However, one or more other devices are contemplated. In uploading a video to the video processing platform, and conducting other interactions with the platform as described herein the upload progress may be depicted dynamically via JavaScript and XML (AJAX) interactions, although other languages are contemplated. Upon upload, the uploaded video may reside on a video storage device 109, as seen in FIG. 1, and the JavaScript at the video upload screen 530 may be adapted to communicate with the video storage device 109 (or video processing unit), through asynchronous JavaScript and XML (AJAX) interactions. These AJAX interactions allow for content to be shared 107 between the browser on the end user device 102 and the communication control device 108 and/or the video storage device 109 via a stateless interface. As described below, AI tags may be provided 103 to the end-user device 102 from the one or more object classification devices 106 via the video storage device 109. However, the one or more object classification devices 106 may also communicate directly with the communication control device 108.

Figure 6:
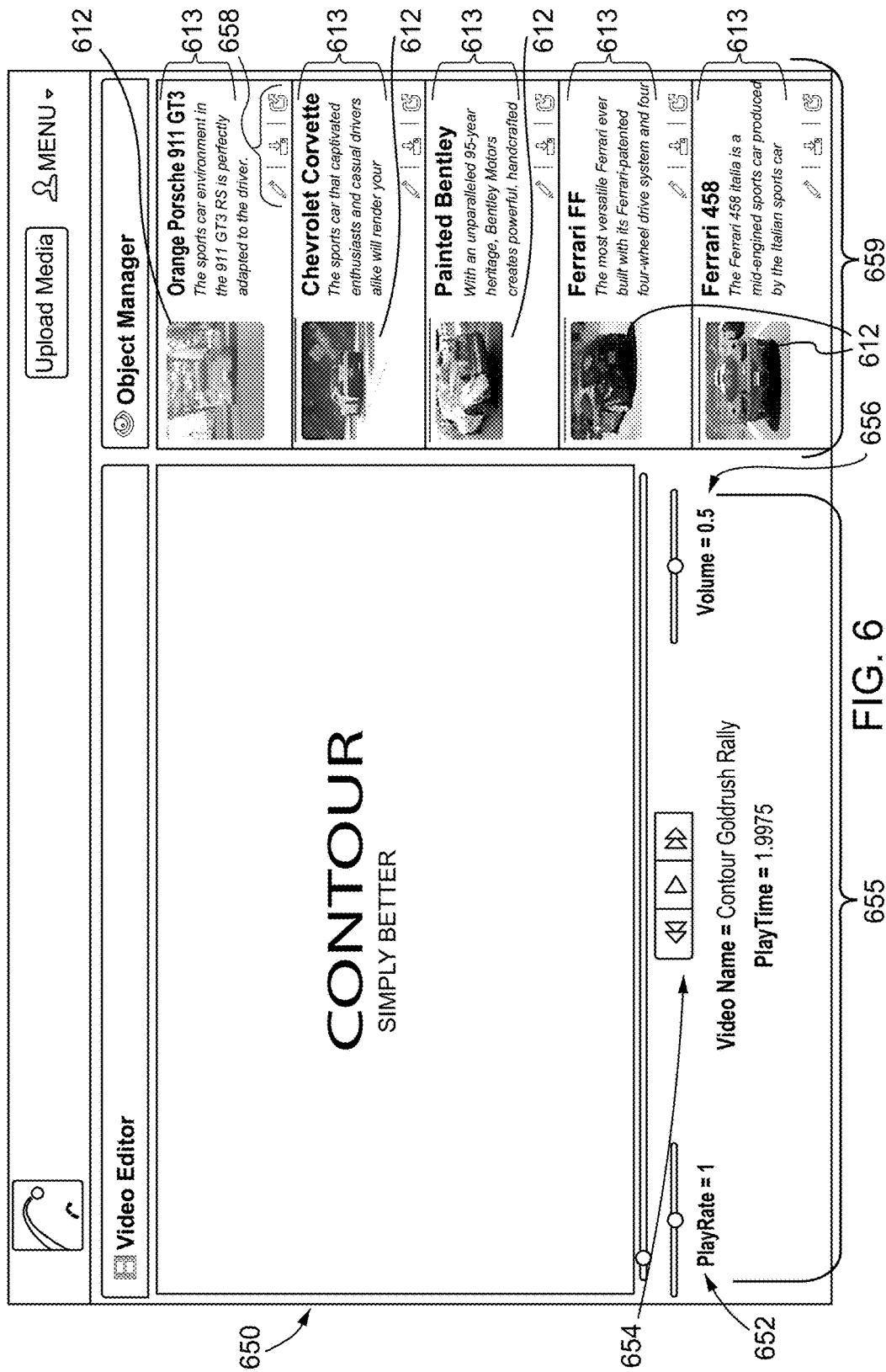
FIG. 6 depicts a vide editor and object manager display according to one embodiment of the invention.

Returning now to the video manager screen 410, seen are various video interactions 417 associated with each of the uploaded video clips 420. A user may select one of these video interactions 417 to interact with an uploaded video in a specific manner. For example, upon selecting the edit video 412 selection, a video editor screen 650, as seen in FIG. 6, may be displayed. The video editor screen 650 may comprise a video display/selection portion 655 and an object manager portion 659. The video display/selection portion 655 may allow a user to adjust a play rate 652 and volume 656 and provide video interaction selections 654 to enable a user to display a prior video frame, a future video frame, or sequence of frames in the video time sequence, and/or play/pause a video playback. The video interaction selections 654 may be employed by a user in order to identify a specific frame, or sequence of frames, in the video.

Video frame selection may be desired to identify one of the one or more video objects 212, as seen in FIG. 2, and subsequently provide information about those objects during the upload of the video to the system 100. For example, in FIG. 2 the video is paused at the frame displayed at the 15.2303 second mark in the video clip. A yellow box surrounds an selected object 222 in the video. The selected object 222 in FIG. 2 comprises a car. This yellow box may comprise an object selector 260 and may be created by the user; for example, a user may use a pointing device such as, but not limited to, a mouse, to create the yellow box and identify the object 222.

Figure 7:
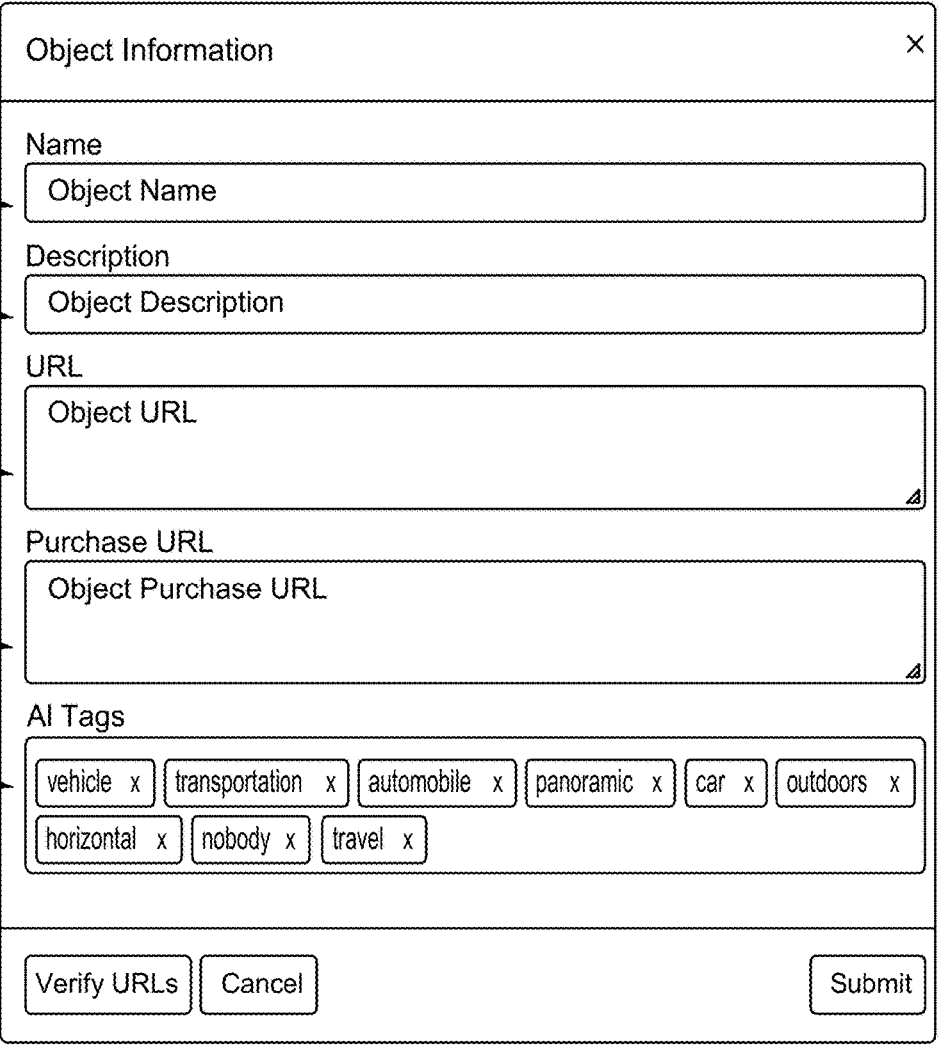
FIG. 7 depicts an object information screen according to one embodiment of the invention.

Upon selecting an object 212 in such a manner, the object information screen 770 seen in FIG. 7 may be automatically displayed (i.e., the screen 770 may comprise a pop-up screen). This screen 770 enables a user to enter metadata associated with the selected object 222. For example, the object may be provided a name 772. The user may also provide a description 774 of the object, enter a URL 776 for the object (e.g., a link for a webpage describing the object) and/or enter a purchase URL 778 for the object (i.e., a link to a webpage to buy the type of object seen in the video). Additional information such as, but not limited, to, the time and/or location of the object in the video (e.g., 15.2303 s) may be associated with the selected object. Such information may be stored in one or more of the devices seen in FIG. 1. For example, this information may be stored in the one or more video object storing devices 104.

The object information screen 770 may also automatically associate AI Tags 779 relating to the object. The AI tags 779 may be obtained through the use of a neural network, such as, but not limited to, a convolutional neural network, or, through processing using a trained machine learning model (e.g., a deep neural network). Other processing options include initiating object tracking via a deep neural network detector on a frame by frame basis, key point tracking, or utilizing localization.

Figure 8:
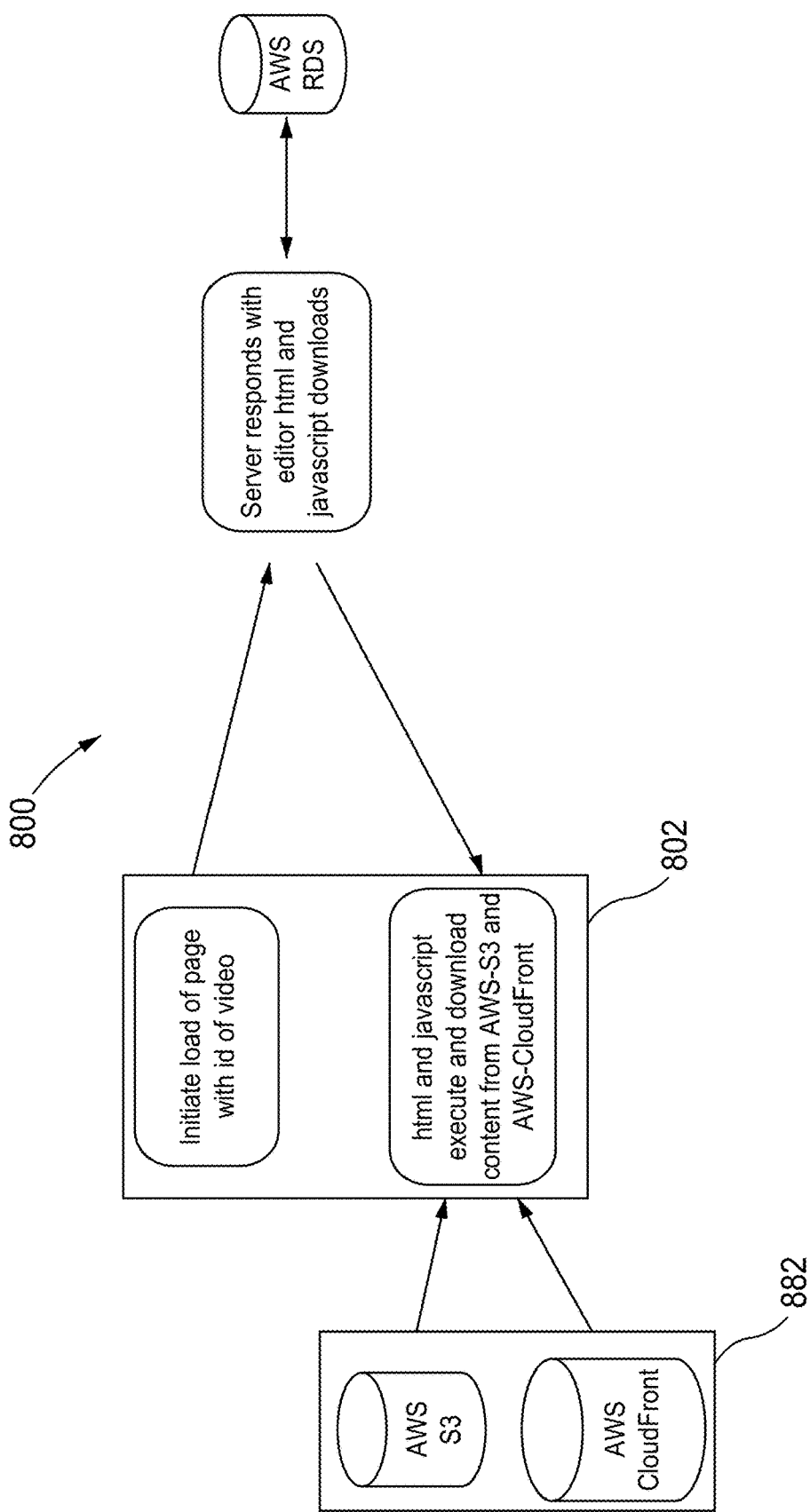
FIG. 8 depicts at least a portion of a video object data storage and processing system according to one embodiment of the invention.
Figure 9:
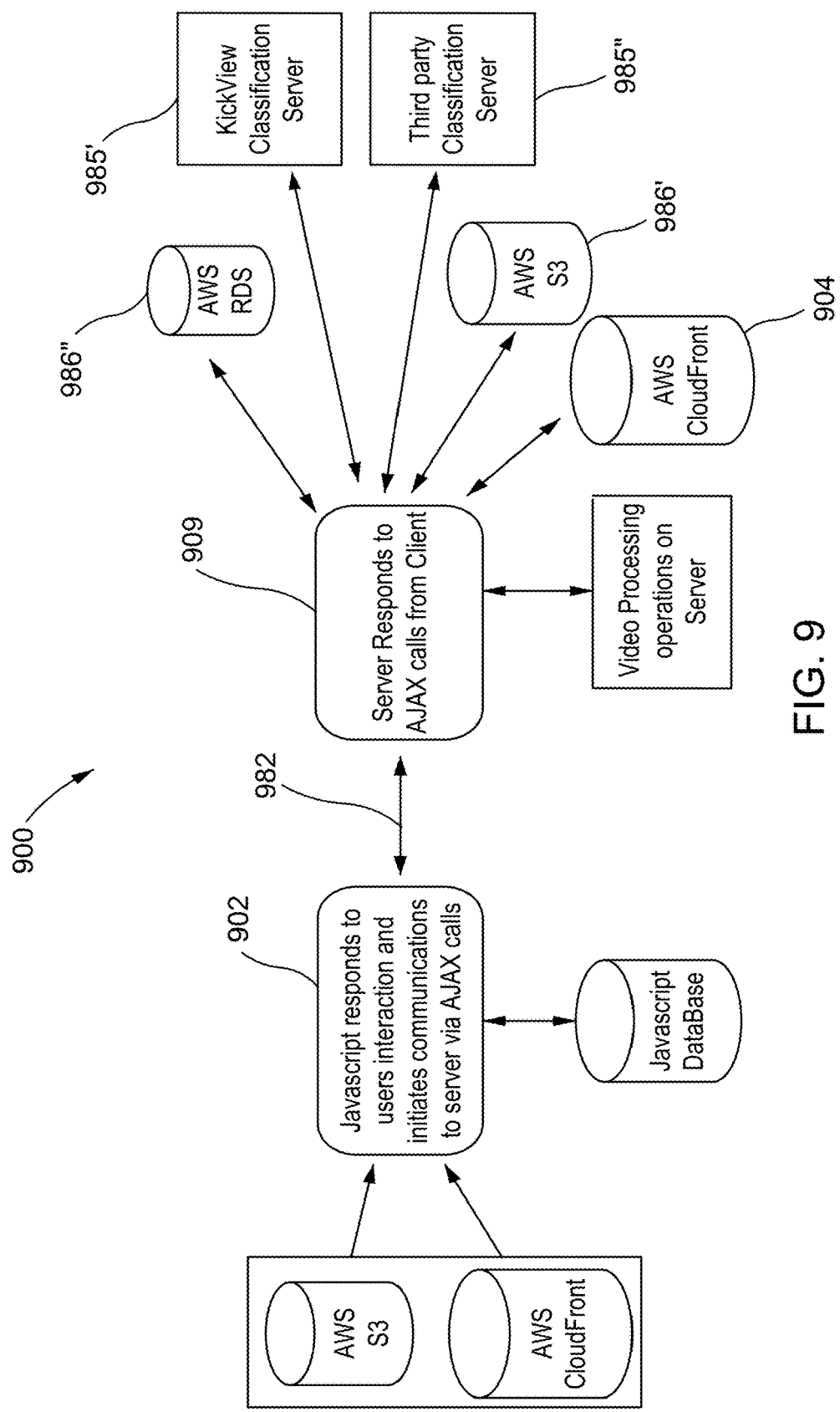
FIG. 9 depicts at least a portion of a video object data storage and processing system according to one embodiment of the invention.

Turning now to FIGS. 8 and 9, seen are graphical representations of a video processing system 800, 900 adapted to (i) enable the association of the information in the object information screen 770 with a video and/or video objects, and (ii) populate the AI tags 779 in the screen 770. In one such system 900, a user device 902 may communicate 982 with a video storage device 909. Such communications 982 may comprise AJAX calls. The video storage device 909 and every other device described herein may comprise one or more devices at one or more physical locations. At least a portion of the video storage device 909 may comprise a Linux server based within an elastic cloud computing environment such as, but not limited to, an AWS-CloudFront device 904, to stream a video to the user device 902. AWS content delivery network (CDN) allows for file caching in different regions to allow for quicker data access. AI tags 779 may be provided to the user device 902 through the system 909 via one or more classification devices 985.

In one embodiment, the AI tags 779 are provided with the help of a first classification device 985' and a second classification device 985". Each of the classification devices 985 may comprise a deep neural network such as, but not limited to, a convolutional neural network adapted to view and identify the object in the object selector 260, as seen in FIG. 2. Each of the first classification device 985' and second classification device 985" may comprise different network structures and/or algorithms such as, but not limited to, various commercially available and proprietary deep neural networks including but not limited to Convolutional Neural Networks (CNN), Fully-Convolutional Networks (FCN), and Recurrent Neural Nets (RNN) and therefore may be adapted to provide different AI tags related to the object. Each algorithm may be associated with a network structure to identify one or more AI tags with each of the one or more video objects. As such, the first classification device 985' may associate one or more first AI tags with each of the one or more video objects and the second classification device may associate one or more second AI tags with teach of the one or more video objects, with at least one of the second AI tags being different than the first AI tags. Alternatively, or additionally, the one or more classification devices 985 may also be adapted to verify the accuracy of the results of any of the other classification devices 985. For example, the at least one communication control device 108 may verify the accuracy of the AI tags from the first verification device 985' by comparing the AI tags from the second verification system with user-supplied metadata.

In one embodiment, the classification devices 985 may receive data related to the object and metadata associated with the object by, for example, the description above with reference to FIGS. 5 & 6. Upon the classification devices 985 identifying the object, through the use of the neural network, the user device 902 may be provided with AI tags 779 associated with the identified object. In one embodiment, the identified object and metadata may be stored on one or more object storage devices 986, which may be separate from any video storage device 909. The object storage devices 986 may be similar to the one or more video object storing devices 104 seen in FIG. 1. In one embodiment, identified object images may be stored on a first object storage device 986' that may comprise an AWS-S3 storage device/server. Object metadata may be stored on a second object storage device 986" that may comprise an AWS-RDS. The second object storage device 986" may also be similar to the one or more video object storing devices 104. Each object that is created by a user and the metadata associated with it may be used by the classification devices 985 in future object identification determinations. The classification devices 985 may be similar to the one or more object classification devices 106 seen in FIG. 1. Recently created and identified objects may be used to improve the capability to identify and classify (e.g., active learning, or fine tuning of existing AI algorithms) newly created and as-of-yet-unclassified objects. In such a manner, new unclassified objects are more likely to be identified and classified properly and the AI tags 779 associated with the object are more likely to be properly related to the object.

Returning now to FIG. 7, seen are the AI tags 779 associated with the object(s) within the object selector 260 shown in FIG. 2. As seen, the object, a red Ferrari, is initially identified by the classification devices with the following terms: "vehicle," "transportation," "automobile," "panoramic," "car," "outdoors," "horizontal," "nobody," and "travel." If desired, one or more of these AI tags may be removed from the list, or tags can be manually added.

Although not displayed herein in the figures, it is further contemplated that additional real-time or near real-time processing may be performed on the video. For example, while the video is playing, a person may initiate an action to begin such processing. One action may comprise using a pointing device such as, but not limited to, a computer mouse, to select a point on the video and move the pointing device is a specified direction. For example, a user may click a video with a mouse and drag the mouse in a vertical direction. The distance that the mouse is dragged may influence the level of processing applied to the video. Other actions are also contemplated. This x/y user interaction can be used to automatically adjust processing parameters and visual display. For example, the image can be morphed between the visual image display and some processed version of the image, such as the activation output from the deep neural network, object classifier, or segmented image as mouse is moved horizontally, while other parameters are adjusted simultaneously such as edge detection thresholds adjusted as the mouse is moved vertically while the results are overlaid on the image with varying opacity as the mouse is moved horizontally, etc.

Upon performing the action, a specified image processing may occur on the video. One such specified image process may comprise a contrast adjustment, and the farther that the mouse is dragged, the greater the amount of adjustment that may occur. This image processing may be applied to all remaining frames in the video as the video is displayed to the user. Additionally, it is contemplated that a user may identify and apply a specific image processing to the action. Such image processing may not comprise linear image processing.

Referring now to FIG. 6, in creating one or more objects in a video in such a manner and associating one or more AI tags with the object, upon accessing the video with the video editor screen 650, the object manager portion 659 may be populated with the images, name, and description of the objects in the video. As the video plays in the video display/selection portion 655 or in the display 210 seen in FIG. 2, the objects associated with that section of the video may be displayed in the object manager portion 659 of the video editor screen. It is contemplated that the objects may also have one or more options 658 associated with each object. For example, a user may be able to edit the metadata associated with the object, download the object image, or be directed to a webpage associated with the object. Additional options are contemplated. It is also contemplated that a user may be able view and search for video object content in near real-time. For example, a frame-by-frame search for specific objects or AI tags may be allowed. In such an embodiment, a user may search for a term across a platform and be provided with all videos and/or objects associated with that term.

It is also contemplated that a second display may be used to view objects. For example, the objects seen in the object manager 659 portion for FIG. 6 may be displayed on a mobile device 114 (phone, iPad, etc.), as seen in FIG. 1 and elsewhere herein. This allows objects to be "kicked" to a second display 115. Such objects may be organized in a specific manner on the mobile device 114, e.g., placed into a shopping list, etc. It is also contemplated that the objects are "kicked" to a second display on the end-user device 102. For example, the objects may be displayed in a second software applications on the device 102 or in a new window of the same software application (e.g., an internet browser) on the device 102.

Figure 13:
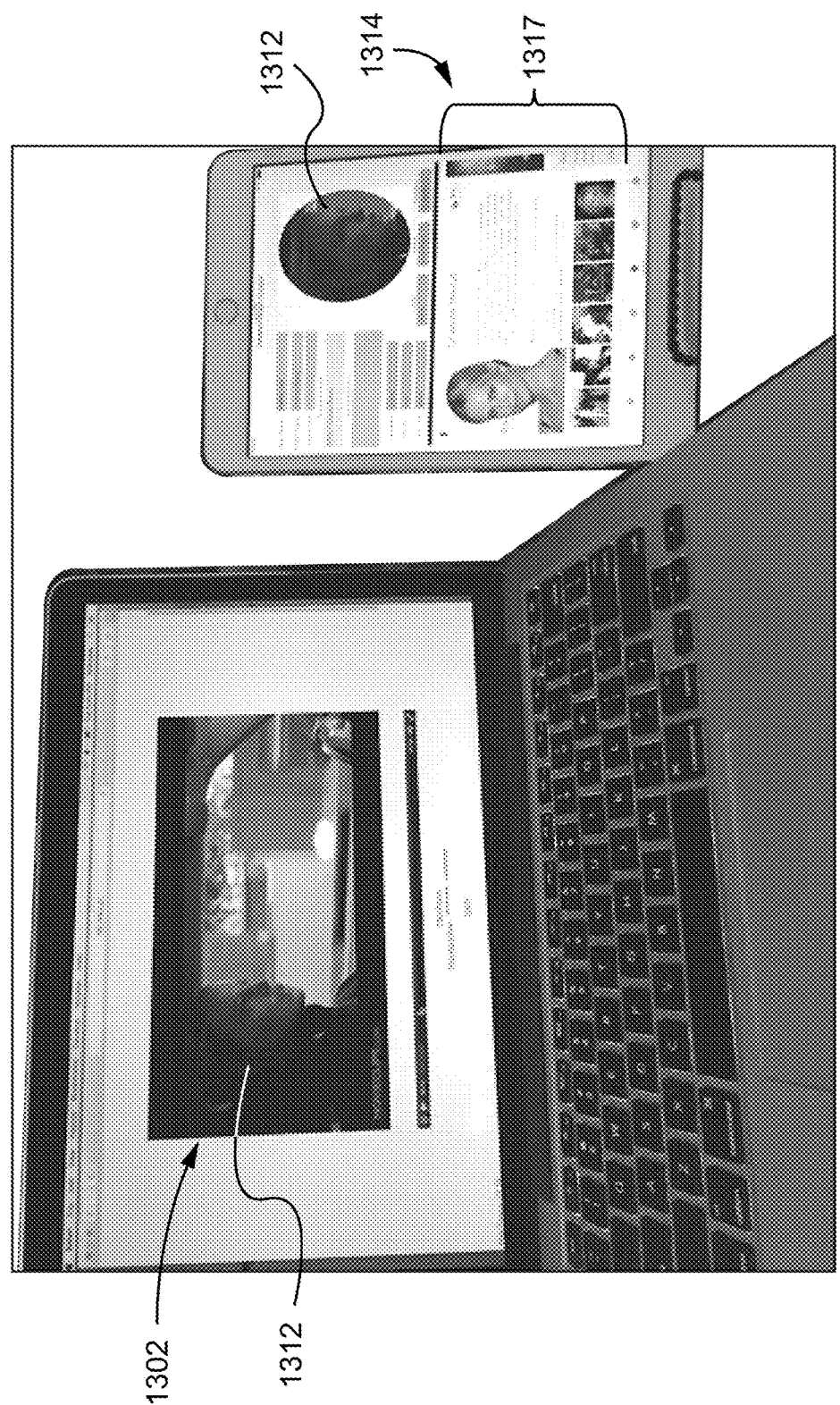
FIG. 13 depicts a first device and a second device according to one embodiment of the invention.

Regardless of the manner and location of display, the objects 612 and associated metadata 613 may be time-synched with the video 653. It is contemplated that playback of the video 653 displayed on the end user device 102, which may be referred to herein as a first device or primary device, may be synched with the object interaction display on the mobile device 114, which may be referred to as an alternative device or second device. Seen in FIG. 13 is one example of an end-user device 1302 displaying video playback and a secondary device 1314 enabling object interaction. The display shown on the secondary device 1314 of FIG. 13 comprises detailed information 1317 about an object 1312 displayed in the video on the end-user device 1302. To display such detailed information 1317, it is contemplated that in viewing a scrolling feed (e.g., the objects may scroll vertically, up or down, as the identified objects are displayed in the video) of time-synched objects 612, as seen in FIG. 6, on the mobile device 1314, as seen in FIG. 13, a user may select an object 612 from the feed in the object manager 659. Upon selecting the object 612, the detailed information 1317 may be displayed related to that selected object. The detailed information 1317 may comprise information about the object in addition to links to additional videos related to the object. Upon selecting an object in the feed on the mobile device 1314, the video displayed in the primary device 1302 may be paused to display the frame of the video associated with the object, enabling the user to see the object in the context of the video at the proper video frame/time. This video frame may comprise a video frame identified as the frame which best displays the selected object. It is further contemplated that the video displayed in the primary device may identify a selected object as the object of interest progresses through the video. For example, a bounding box, which may be similar to the object selector 260 seen in FIG. 2, may identify such an object in the scene. It is further contemplated that the object selector may comprise an ellipse. Such an ellipse may or may not be displayed in every frame.

In order to isolate and track the object 1312 in the video, object identification and object data storage techniques were developed. A concise representation of an object location and region that it occupies within the successive video frames within a video is very important. A method of storage that is amenable to a database is also very desirable for software applications to access databases comprising the object location information, enabling a robust and scalable means of meta-data storage scalable across many users and videos accessing objects on secondary devices 1314.

Figure 14:
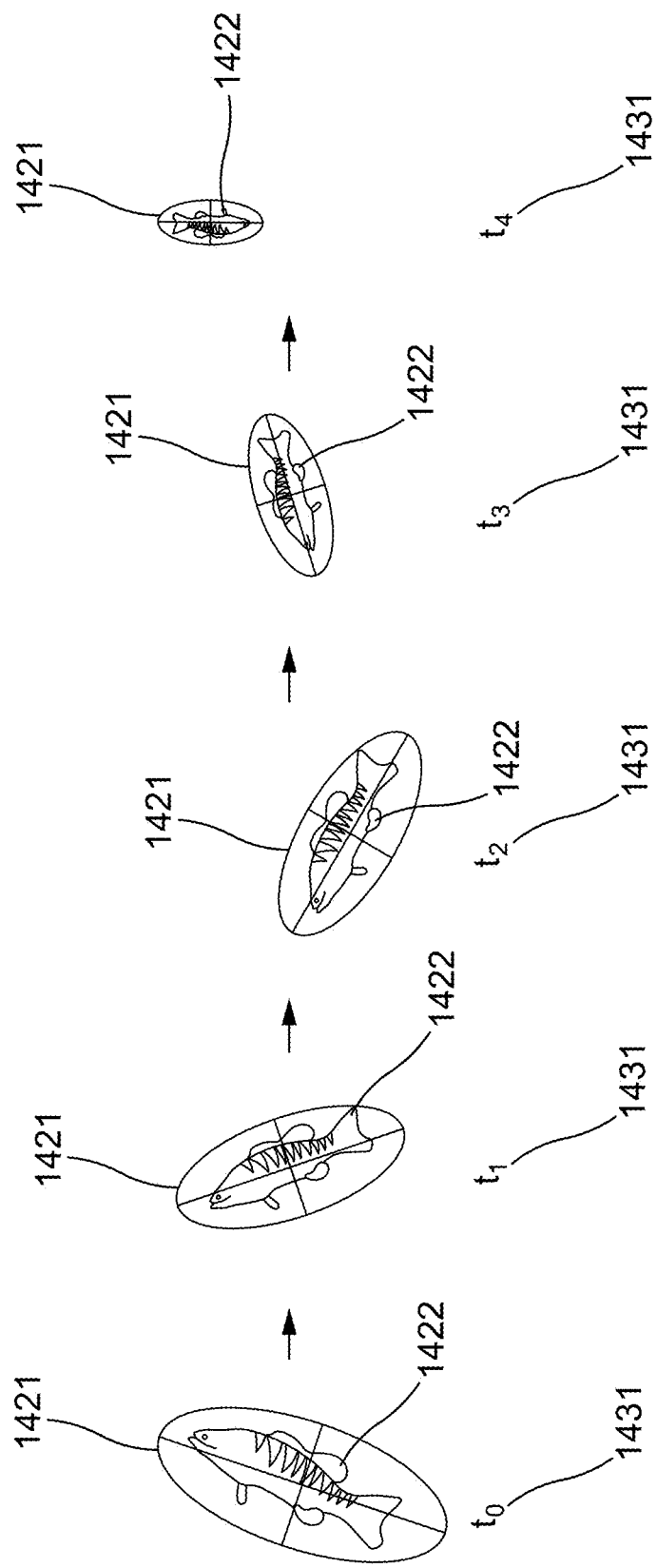
FIG. 14 depicts a series of video objects with an associated ellipse according to one embodiment of the invention.

FIG. 14 displays depicts five fish poses as the fish moves through a video segment from time $t_0$ to $t_4$. The fish seen in FIG. 14 comprises the selected object 1422. A containment ellipse 1421 has been placed around the object 1422 in order to identify the object throughout the video segment. The containment ellipse 1421 may also be referred to herein as an ellipse 1421, a CE 1421, or as a video object shape. Other shapes besides ellipses are contemplated. In other shapes, other dimensions of the shapes besides, or in addition to, the dimensions of the parameters disclosed herein, may be utilized. As seen in FIG. 14, within a video sequence the object 1412 can change scale/size, pose, and location. These types of changes may be described as perspective transforms or transformations of the object 1412 within the video. The object 1412 is treated as a set of containment ellipses 1421. These ellipses 1421 encompass the object 1422 within an identified video frame and describe not only its size, shape and position but also its orientation. Several containment ellipses 1421 are shown in FIG. 14 for the same object 1412 at different perspectives.

Figure 15:
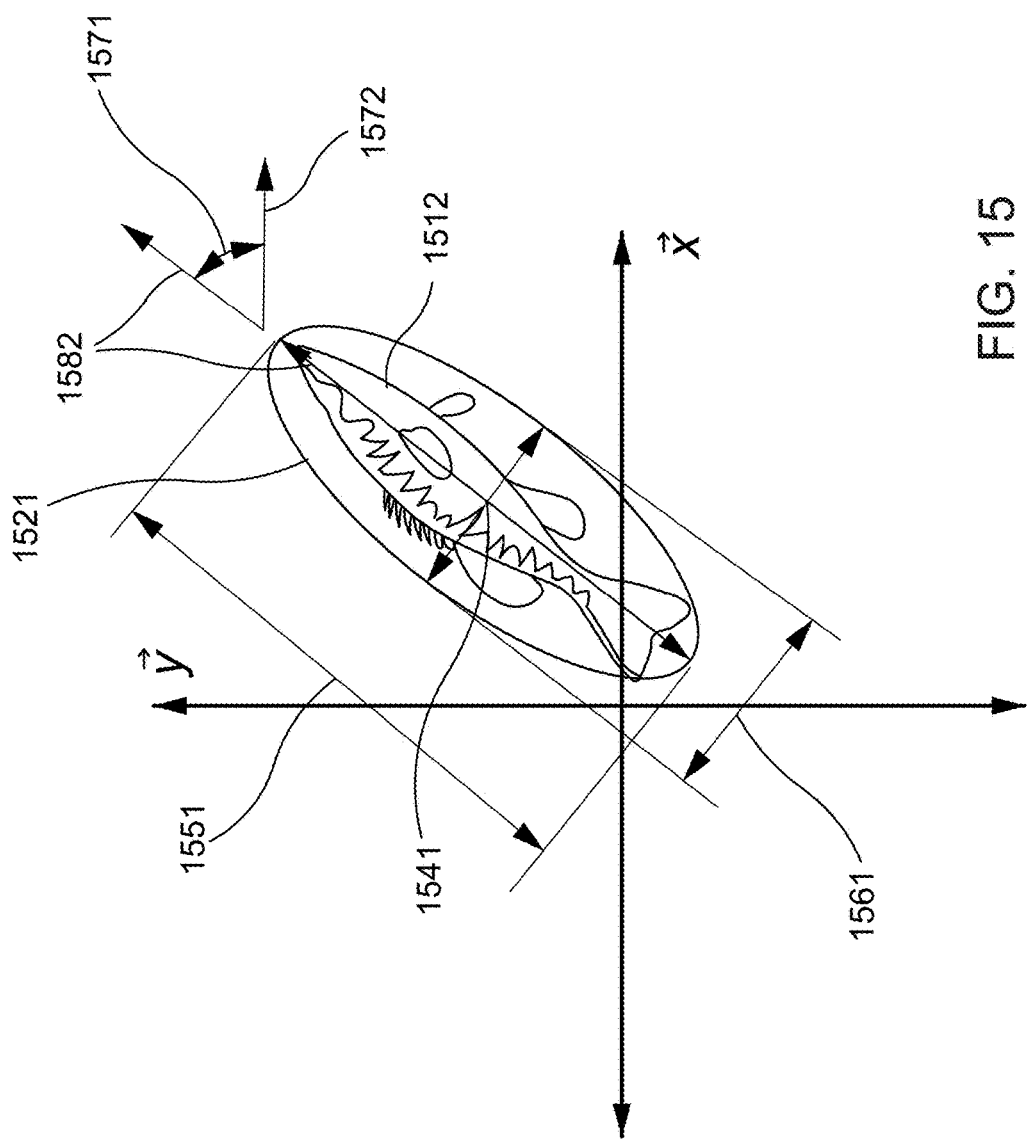
FIG. 15 depicts the ellipse parameters according to one embodiment of the invention.
Figure 16:
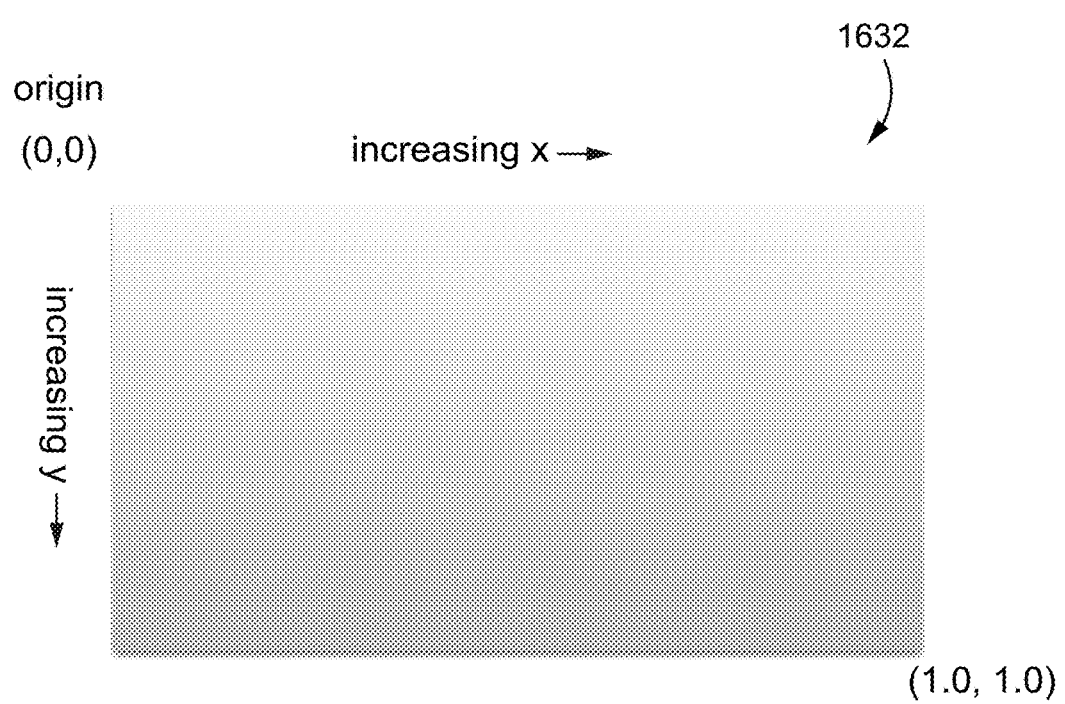
FIG. 16 depicts a reference frame according to one embodiment of the invention.

The containment ellipses 1421 are defined by the time stamp 1431 associated with each ellipse 1421, including the start time (to) and stop time ($t_4$) within the video for the object 1412. One of the additional parameters comprises a Q-Metric of the object 1412. The Q-metric is a measure of object quality, clarity and best-pose that is used for the selection of the best representative object 1312 image to displayed on the secondary device 1314. The Q-metric may be obtained by applying a Laplacian (High-Pass-Filter) to an isolated image converted to gray-scale. The variance of the time series created by flattening the two dimensional matrix into a vector is an estimate of the energy contained in the high frequency component of each the images contained with the bounding ellipse. The Q-Metric is a number associated with this variance measure. The large the number the higher the high frequency energy is the image with the higher clarity, and lower Q-metric is associated with images with lower clarity (blurrier) images. As seen in FIG. 15, additional parameters include a center-mass location 1541, ellipse-major 1551, ellipse-minor 1561, and ellipse-angle 1571. The object location may be described by the center-mass location 1541 at each frame. The center-mass location 1541 comprises a normalized (x, y) two-tuple depicting object center of mass within a normalized image frame and may comprise the location of the intersection of the ellipse-major 1551 and the ellipse-minor 1561. For example, seen in FIG. 16 is one reference frame 1632 for conducting the ellipse 1521 measurements. With such a reference frame 1632, objects may be described with values from (0.0, 0.0)

to (1.0, 1.0). The upper-left point in the frame 1632 comprises the origin and the lower-right point comprises a maximum defined extent of the image area at (1.0, 1.0). All objects defined by such a frame 1632 may be described in floating point values with reference to the frame/scale depicted in FIG. 16. Use of a reference frame 1632 enables proper identification of an object's location and scale within a display image/frame across multiple resolutions. Images/frames comprising the highest resolution may be desired/chosen, though images/frames comprising varying object resolutions may be obtained. An object description should be consistent between multiple instances of the same image in differing resolutions.

The ellipse measurements may comprise vector measurements, as described herein. For example, a vector's parameters (also revered to herein as a containment vector, or a CV) may comprise (a, b, c, d, e), where a is the major axis length, b is the minor axis length, c is the center-mass location, d is the angle, and e is the time). Through the use of these parameters, an object's 1512 size/scale, shape, orientation, location and pose/tilt may be determined.

The object pose and scale are characterized by the ellipse-major 1551, ellipse-minor 1561, and ellipse-angle 1571. The ellipse-major 1551 comprises a normalized length of the major axis of the containing ellipsoid 1521 around the object 1512. The ellipse-minor 1561 comprises the normalized length of the minor axis of the containing ellipsoid 1521 around the object 1512. The ellipse-angle 1571 comprises a radian angle between the reference frame x-axis 1572 and the major axis vector orientation 1582, although other angles are contemplated. These measurements may be associated with a reference frame-time, frame number, or time stamp 1431, as shown in FIG. 14 and placed into a vector value. All vector values may be stored with a database on one or more the devices seen in FIG. 1 and elsewhere as described herein.

An object 1412 may be present for seconds or several minutes within a video sequence. At 24-60 frames per second, the amount of data associated with an object, as described herein, can quickly become a very large data storage problem for a video with thousands of objects. Given the parameters described herein, and that normal video objects are constrained to kinematic real-world requirements and the laws of physics, the ellipses 1422 that define the object 1412 through the use of a vector are typically highly correlated. This means that as the object 1412 moves fairly smoothly between frames, the generated parameter values in successive frames are highly correlated. Since the objects 1412 move slowly with respect to the video framing rate, the need to maintain the ellipsoid parameters for each video frame is probably unnecessary since the parameters comprise highly correlated information. Such a correlation between ellipsoid parameters of nearby frames allows for a more concise way to store object data.

Figure 17:
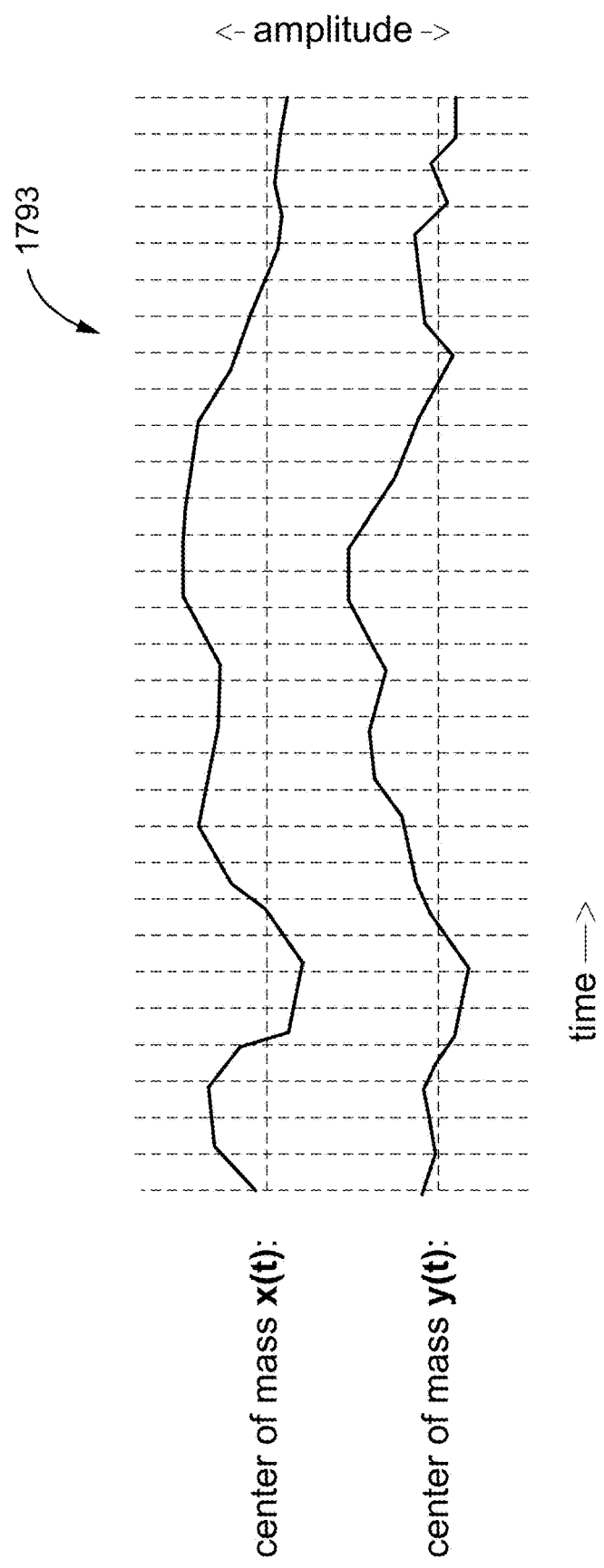
FIG. 17 depicts a graph according to one embodiment of the invention.

For example, each parameter may be can be looked at a single time series. FIG. 17 shows a time series 1793 depiction for the x and y elements of an ellipse center-mass location 1541 as an object 1512 moves through a scene. Such an approach may be used to depict the time progression of all parameters of the ellipse 1521. In such a scenario, a sample rate selection of around five to ten vector values per second of video may occur. Interpolation can then be used to regenerate the vector values between stored sample points. Greater or larger values per second may occur as well—e.g., 2-3 values/s or 10-20 values/s.

Interpolation may occur using a linear model with basis functions described by polynomials. However, the basis functions do not have to be defined as polynomials, although linear summation of the basis functions should be implemented. Once a linear technique is established, a Linear Least Squares or a Linear Weighted Least Squares approach can be used to find low-order polynomials that can effectively model the time progressions of each of the parameters vs time. The use of a low order polynomial to describe each time-vector representation of the parameters is very efficient since the polynomial coefficients can easily be stored in a database. The object location can be determined in the subsequent frames beyond the start time by interpolating each parameter for the correct time via a polynomial expansion for each parameter.

One Least Squares fitting problem is described below. Here, the intent is to extract a polynomial with M terms and a degree M−1 to describe a data set of N elements with N>M. The coefficients of the modeling polynomial are in $b_n$ and the data being modeled is presented as 2-tuples of ($t_n$, $y_n$) where $t_n$ is the sample time, $t_s$ is the start time of measurements, and $y_n$ are the values of the measurements. The system of equations is depicted below.

$$b_0 + b_1(t_0 - t_s) + b_1(t_0 - t_s)^2 + b_2(t_0 - t_s)^3 \ldots b_{M-1}(t_0 - t_s)^{M-1} = y_0$$

$$b_0 + b_1(t_1 - t_s) + b_1(t_1 - t_s)^2 + b_2(t_1 - t_s)^3 \ldots b_{M-1}(t_1 - t_s)^{M-1} = y_1$$

$$\vdots$$

$$b_0 + b_1(t_{(N-1)} - t_s) + b_1(t_{(N-1)} - t_s)^2 +$$
$$b_2(t_{(N-1)} - t_s)^3 \ldots b_{M-1}(t_{(N-1)} - t_s)^{M-1} = y_{(N-1)}$$

This system of equations can be solved in a least squares sense by the following construction:

$$A = \begin{bmatrix} 1 & \alpha_0 & \alpha_0^2 & \alpha_0^3 & \ldots & \alpha_0^{(M-1)} \\ 1 & \alpha_1 & \alpha_1^2 & \alpha_1^3 & \ldots & \alpha_1^{(M-1)} \\ 1 & \alpha_2 & \alpha_2^2 & \alpha_2^3 & \ldots & \alpha_2^{(M-1)} \\ & & \vdots & & & \\ 1 & \alpha_{(N-1)} & \alpha_{(N-1)}^2 & \alpha_{(N-1)}^3 & \ldots & \alpha_{(N-1)}^{(M-1)} \end{bmatrix} \text{ where } \alpha_n =$$

$$(t_n - t_s)$$

$$b = [b_0 \ b_1 \ b_2 \ \ldots \ b_{(M-1)}]^T$$

$$y = [y_0 \ y_1 \ y_2 \ \ldots \ y_{(N-1)}]^T$$

This system of equations can then be represented in matrix form as:

$$Ab = y$$

This system of equations can be solved by a least squares method with the following construction:

$$b = (A^T A)^{-1} A^T y$$

In one embodiment, the database comprises a first vector with the first vector comprising a plurality of first vector parameters. The plurality of first vector parameters comprise the first major axis length, the first minor axis length, the first center-mass location, the first angle, and the first time. The database may also comprise a second vector with the second vector also comprising a plurality of second vector parameters and the plurality of second vector parameters comprising a second major axis length, a second minor axis length, a second center-mass location, a second angle, and a second time. The second time may be greater than the first time. The database further comprises a third vector with the third vector comprising a plurality of third vector parameters. The plurality of third vector parameters comprises a third major axis length, a third minor axis length, a third center-mass location, and a third angle. Such third vector parameters may be obtained by interpolating the first vector parameters and the second vector parameters for a given third time. The third time may be greater than the first time and less than the second time. At least one of a Linear Least Squares and a Linear Weighted Least Squares approach may be used to obtain the third vector parameters.

It is contemplated that the containment vector parameters may be stored and accessed on the server (e.g., one of the devices seen in FIG. 1) in at least two different ways, in order to meet the requirements of two somewhat dissimilar processing flows. The first processing flow is described herein as a 'Like-List' processing flow, also referred to herein as an automatic method. The second processing flow comprises a user-guided request for an object of interest that is selected manually from a requested set of video frames, also referred to herein as the manual method. This is the method described with reference to the object selector 260, seen in FIG. 2.

In the automatic method flow, will implement a user's like-list. A like-list may be generated based on user's interaction with video objects in the current video, all prior videos, or a specified combination of videos (e.g., all sports videos, or baseball videos, or movies, or comedies, etc.). Such interaction may comprise selecting an object on a mobile device 1314, as seen in FIG. 13, or may comprise choosing a feature associated with a particular object. One such feature may comprise a "like" selector. The like-list may also be generated using other methods known in the art. The list may be stored on a device seen in the system 100.

Upon generation of a user's like-list, when an object is displayed in a video that is being streamed or otherwise provided from a content provider to the user, the object information conveyed to the user's secondary device 1314 may only comprise single image frame of the object at the best q-metric value that was found while tracking the object. The object description meta-data as described with reference to FIG. 7 and elsewhere herein may also be presented to the user.

In the manual method, a user may, for example, enable a selection on the secondary device that is associated with an identified object or object grouping which informs a device seen in FIG. 1 or elsewhere as described herein (e.g., a content provider) to deliver a sequence of video frames so that the user's object(s) of interest are displayed and can be selected. In the manual method flow, a sequence/succession of video frames may be extracted and presented to the user. The frames sent to the user may comprise low-resolution images to conserve link bandwidth. The user may then select a desired object from the frames. The data sent to the secondary device may comprise the locations of the known objects that were found by the any Pre-Processing operations within the user's image frames. Upon selection of an area within a frame, the object(s) within the selected region will be requested from a server. These results include images in high resolution, along with detailed meta-data along with any crowd-sources content about the object(s).

In the object data storage model for the automatic method, each object may be described with a data structure comprising a type/sub-type and supporting data. For example, the type may comprise "vehicle" and the subtype may comprise "sedan." The object's best-image pose/data (max q-metric), description, hyper-links associated with the object, and the object's extent in time may also be stored. The automatic method may also support a secondary database/table comprising the user's like-list. Object filtering operations may be performed on this database. For example, a user may select which categories of objects they wish to receive; e.g., all SUVs but no other types of vehicles. Additionally, the user may modify and/or make additions to their like-list via the secondary device 1314, as seen in FIG. 13. Crowd sourcing and feedback mechanisms may also be supported on the secondary device 1314. Other users may add information content to the object with the videos owner of the object being able to adjudicate the content accepted for further dissemination.

Data storage related to the Manual may be more extensive as compared to the automatic method. In one embodiment, the manual method may be invoked by the user requesting from the server (via AJAX) a sequence of image frames from the movie being viewed. Data comprising the images in a low-resolution format, along with accompanying object detection location data (e.g., object data and the video time the object was viewable in the video) may be sent to the user's secondary device 1314 from the server. A user's normal stream of automatic method requests from 'Like List' hits may continue to flow to the user's secondary device 1314 un-interrupted during the servicing of the manual method request.

In one embodiment, the manual method may make available the object location information to a KickView Real-time server, which may comprise the device 108 in FIG. 1. Images from each video frame may also need to be locally available as a user may manually select any time window for a requested image frame. Such mages may comprise lower resolution frames, synthesized to a locally available hi-resolution frame. When the user selects the object of interest from the low-resolution image, the associated hi-resolution image (along with the correct object Containment Ellipse) may be sent to the user along with any of the meta-data that was available from the automatic table in the KickView database, which may comprise one of the other devices in FIG. 1. If there are multiple objects proximate to a user's selection region, then multiple objects may be returned to the user. The best estimated image (highest q-metric) from the Automatic table can also be sent if necessary.

To fulfill the requirements of the user being able to select any arbitrary time within the video sequence, some way of storing all objects as they exist within the video will have to be maintained. The simplest method is to store the Containment Vector (CV) for each object within some sort of database. This raw CE elements that make up the CV for an object will be linked to the Automatic Table within the database to hold the detailed meta-data about a particular object. The raw elements of the CE at the framing rate of the video will be highly correlated, (slowly changing) hence the need to keep the CE at the framing rate is unnecessary. The selection of a more appropriate rate of 5-10 CE's per second may be acceptable and any sub-frames can be interpolated. The data requirement for this type of operation are still large but may be manageable for the purpose of demonstration. The decision send the user selected information or the object with the best q-metric with a small time window around the users selection will have to be determined. Similar calculations may be conducted for a $3^{rd}$ dimension, where the reference graph 1632 as seen in FIG. 16 and the parameters seen in FIG. 15 comprise measurements in a z-direction, perpendicular to the x and y directions.

Seen in FIG. 8 is one representation of a video processing system 800 that may comprise a convolutional/deep neural network to, for example, provide AI tags to the object information screen 770, as seen in FIG. 7. In one such embodiment, a user device 802 may launch the video editor 650 screen, as seen in FIG. 6, or otherwise choose to view (through a viewer) and/or edit a video. The video content provided to the video editor 650 may be provided from a content storage device 882. The arrows in FIG. 8 may also display a method of loading videos into the system 800 and populating the videos with AI tag content.

Figure 10:
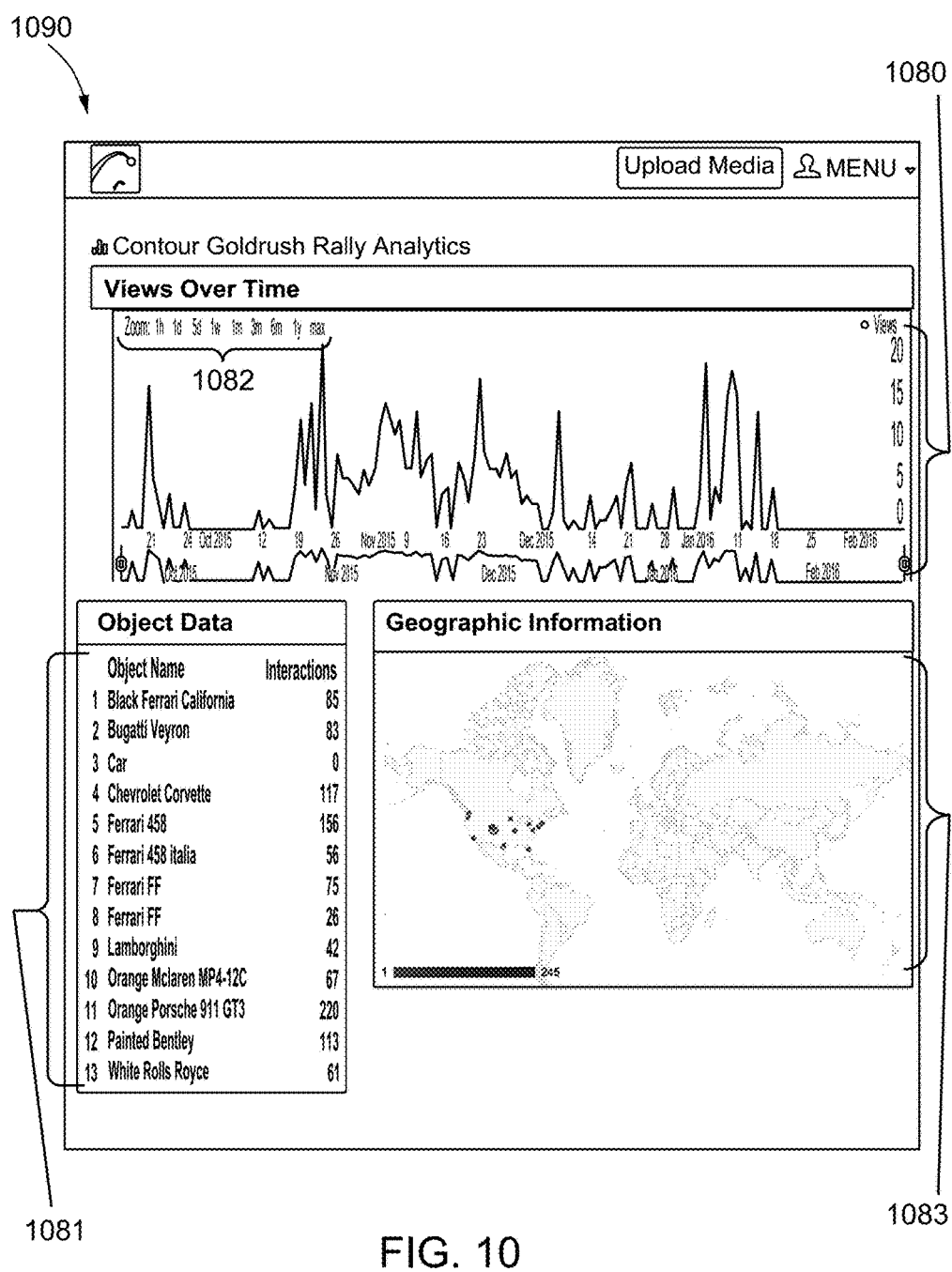
FIG. 10 depicts an analytics screen according to one embodiment of the invention.

FIG. 10 shows an analytics screen 1090 for at least one embodiment of the system 100, as seen in FIG. 1, described herein. The analytics screen 1090 may display the number 1080, type 1081, time 1082, and location 1083 of interactions with each video/object. Object level analytics provide detailed information about viewer interactions and interest in specific objects, not just the video as a whole. Information about object interactions can show origin (e.g., country, city, etc.) of viewer interacting with the object, frequency of interaction, action with object (share via email, text, social media, blog, etc.), purchase behavior, return visits and interaction, etc.

With the system 100, viewers can share objects or list of objects with others (e.g., friends, etc.) via the primary device/app or the secondary device/app by email, text, social media, internet post. The user/device that receives the object or list of objects can interact with the objects on their device and be taken to the video (and time/frame in the video where there object originated.)

The system described herein may also be used to detect changes in video objects. For example, the one or more classification devices 985, as seen in FIG. 9, may operate in real-time for a video stream such as, but not limited, a live video stream. During such a scenario, the one or more classification devices 985 may identify objects in the video. A user may be alerted if the classification of any one object, or for any object identified by a user, changes. Such alerting may be provided on one or more second displays 115, i.e., one or more mobile devices 114. Alerts may be issued when someone else creates, adds info about, or comments on object.

Figure 12:
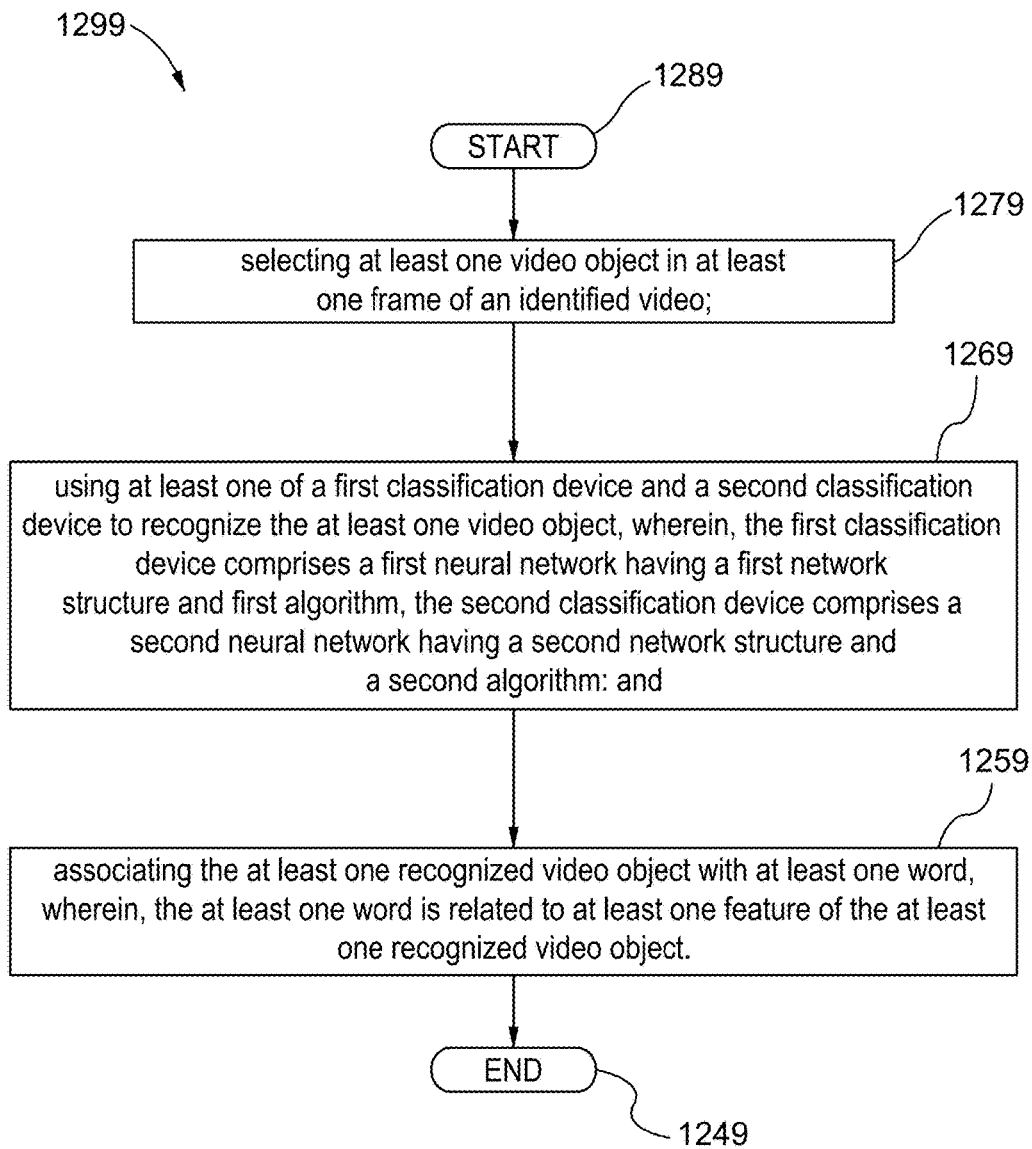
FIG. 12 depicts a method that may be implemented according to one embodiment of the invention.

Turning now to FIG. 12, seen is a method 1299 of identifying a video object. One method 1299 starts at 1289 and at 1279 comprises selecting at least one video object in at least one frame of an identified video. It is contemplated that the identified video may comprise a plurality of videos. Furthermore, and as seen in FIG. 2, is one example of a video object 222 selected in a displayed video frame. As described herein, the object was selected using a pointing device, such as, but not limited to, a computing mouse, to create a box around the object. Metadata may be associated with the object 222, as described herein. Such metadata may comprise, for example, manually giving the object a name, selecting a category for the object, and/or typing keywords related to the object.

At step 1269, the method 1299 comprises using at least one of a first classification device and a second classification device to recognize the at least one video object, with the first classification device comprising a first neural network having a first network structure and a first algorithm and the second classification device comprising a second neural network with a second network structure and second algorithm. It is contemplated that the second neural network may be different than the first neural network. At step 1259, the method 1299 comprises associating the at least one recognized video object with at least one word, with the at least one word being related to at least one feature of the at least one recognized video object. For example, as seen in FIG. 7, the AI Tags 779 comprise words related to the object 222 seen in FIG. 2. The method 1299 ends at 1249.

It is further contemplated that a user may wish to identify which of the one or more videos are associated with the at least one word. For example, a user may wish to display all scenes in a single video that the phrase "red Ferrari" is associated with. Or, a user may wish to search a plurality of videos that include the one word "Ferrari." AI Tags may also be used to locate one or more additional video objects in the plurality of videos. For example, the term "red Ferrari" may be used to find videos related to "speeding."

Upon selecting an object, such as, but not limited to, the object 222 seen in FIG. 2. a video object data storage and display system may be used to identify the object. One such system may comprise a video object data selection portion. One such portion may reside on one of the devices see in Another embodiment of the invention comprises a non-transitory, tangible processor readable storage medium, encoded with processor executable code to perform a method for storing the location of an object through the scene of a video. One such medium and processor may be described with reference to FIG. 11. Such a method may be implemented utilizing the system 100 described herein. One method may comprise, with reference to the disclosure herein, obtaining an object location for a plurality of video frames; enclosing the object in the plurality of video frames with a geometric shape; determining parameters related to the ellipse for the plurality of video frames; and using the parameters for at least two of the plurality of video frames to obtain the object location for another video frame.

Figure 11:
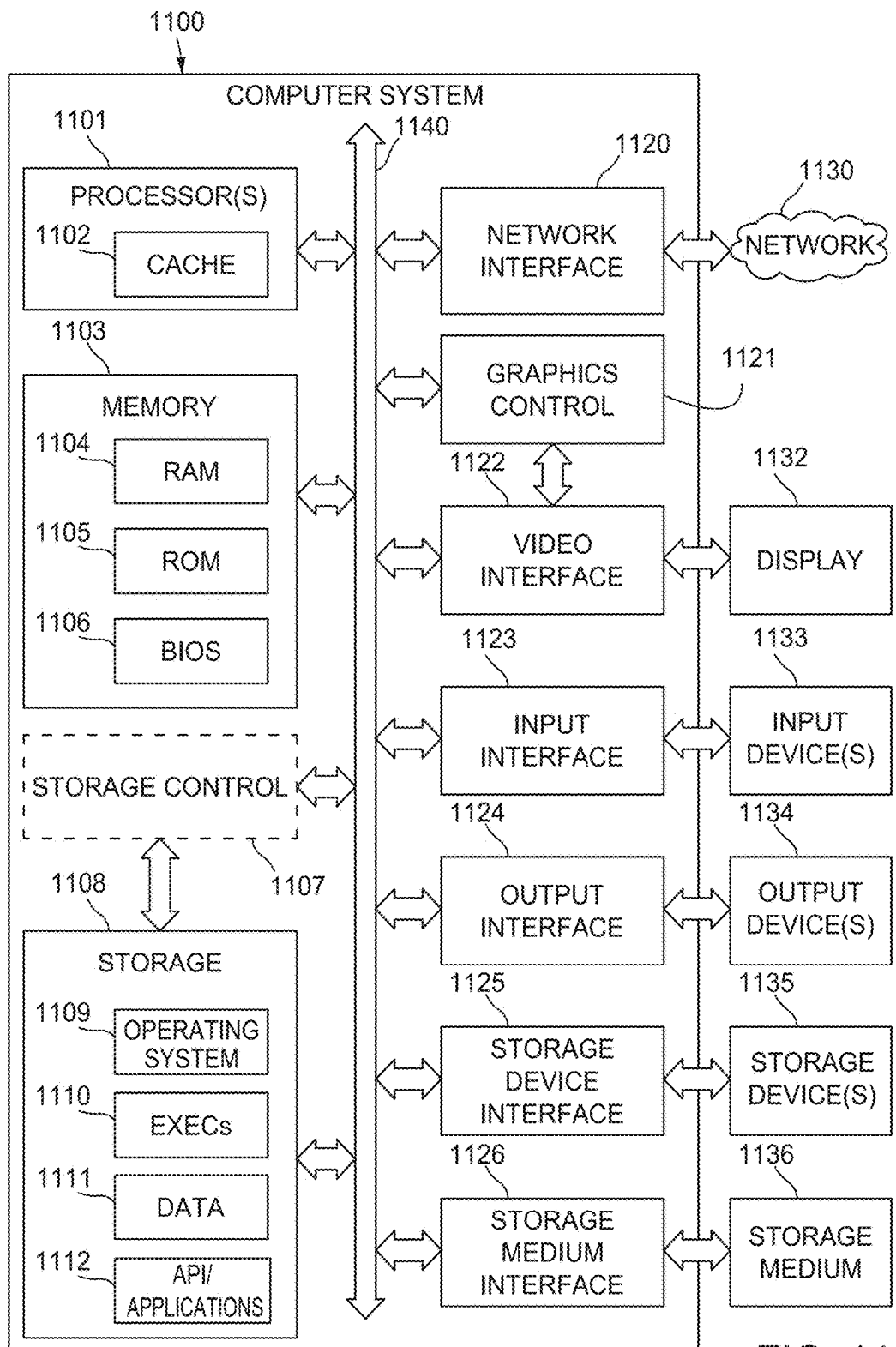
FIG. 11 depicts an exemplary embodiment of a computing device according to one embodiment of the invention.

In addition to the specific embodiments described herein, the systems and methods described herein can be implemented in a computer system such as, but not limited to the FIG. 11 diagrammatic representation of one embodiment of a computer system 1100 within which a set of instructions can execute for causing a device to perform or execute any one or more of the aspects and/or methodologies of the present disclosure. The components in FIG. 11 are examples only and do not limit the scope of use or functionality of any hardware, software, firmware, embedded logic component, or a combination of two or more such components implementing particular embodiments of this disclosure. Some or all of the illustrated components can be part of the computer system 1100. For instance, the computer system 1100 can be a general-purpose computer (e.g., a laptop computer) or an embedded logic device (e.g., an FPGA), to name just two non-limiting examples.

Computer system 1100 includes at least a processor 1101 such as a central processing unit (CPU) or an FPGA to name two non-limiting examples. Any of the subsystems described throughout this disclosure could embody the processor 1101. The computer system 1100 may also comprise a memory 1103 and a storage 1108, both communicating with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1335, and various non-transitory, tangible computer-readable storage media 1136 with each other and/or with one or more of the processor 1101, the memory 1103, and the storage 1108. All of these elements may interface directly or via one or more interfaces or adaptors to the bus 1140. For instance, the various non-transitory, tangible computer-readable storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1101 (or central processing unit(s) (CPU(s))) optionally contains a cache memory unit 1132 for temporary local storage of instructions, data, or computer addresses. Processor(s) 1101 are configured to assist in execution of computer-readable instructions stored on at least one non-transitory, tangible computer-readable storage medium. Computer system 1100 may provide functionality as a result of the processor(s) 1101 executing software embodied in one or more non-transitory, tangible computer-readable storage media, such as memory 1103, storage 1108, storage devices 1135, and/or storage medium 1136 (e.g., read only memory (ROM)). Memory 1103 may read the software from one or more other non-transitory, tangible computer-readable storage media (such as mass storage device(s) 1135, 1136) or from one or more other sources through a suitable interface, such as network interface 1120. Any of the subsystems herein disclosed could include a network interface such as the network interface 1120. The software may cause processor(s) 1101 to carry out one or more processes or one or more steps of one or more processes described or illustrated herein. Carrying out such processes or steps may include defining data structures stored in memory 1103 and modifying the data structures as directed by the software. In some embodiments, an FPGA can store instructions for carrying out functionality as described in this disclosure. In other embodiments, firmware includes instructions for carrying out functionality as described in this disclosure.

The memory 1103 may include various components (e.g., non-transitory, tangible computer-readable storage media) including, but not limited to, a random access memory component (e.g., RAM 1304) (e.g., a static RAM "SRAM", a dynamic RAM "DRAM, etc.), a read-only component (e.g., ROM 1105), and any combinations thereof. ROM 1105 may act to communicate data and instructions unidirectionally to processor(s) 1101, and RAM 1104 may act to communicate data and instructions bidirectionally with processor(s) 1101. ROM 1105 and RAM 1104 may include any suitable non-transitory, tangible computer-readable storage media. In some instances, ROM 1105 and RAM 1104 include non-transitory, tangible computer-readable storage media for carrying out a method. In one example, a basic input/output system 1106 (BIOS), including basic routines that help to transfer information between elements within computer system 1100, such as during start-up, may be stored in the memory 1103.

Fixed storage 1108 is connected bi-directionally to processor(s) 1101, optionally through storage control unit 1107. Fixed storage 1108 provides additional data storage capacity and may also include any suitable non-transitory, tangible computer-readable media described herein. Storage 1308 may be used to store operating system 1109, EXECs 1110 (executables), data 1111, API applications 1312 (application programs), and the like. Often, although not always, storage 1108 is a secondary storage medium (such as a hard disk) that is slower than primary storage (e.g., memory 1103). Storage 1108 can also include an optical disk drive, a solid-state memory device (e.g., flash-based systems), or a combination of any of the above. Information in storage 1308 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide nonvolatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1300 may enter commands and/or other information into computer system 1100 via input device(s) 1133. Examples of an input device(s) 1133 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, or any combination of the above.

In particular embodiments, when computer system 1100 is connected to network 1130, computer system 1100 may communicate with other devices, such as mobile devices and enterprise systems, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1300 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof.

A network, such as network 1130, may employ a wired and/or a wireless mode of communication. In general, any network topology may be used.

Information and data can be displayed through a display 1132. Examples of a display 1132 include, but are not limited to, a liquid crystal display (LCD), an organic liquid crystal display (OLED), a cathode ray tube (CRT), a plasma display, and any combinations thereof. The display 1132 can interface to the processor(s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121.

In addition to a display 1132, computer system 1100 may include one or more other peripheral output devices 1134 including, but not limited to, an audio speaker, a printer, and any combinations thereof. Such peripheral output devices may be connected to the bus 340 via an output interface 1124. Examples of an output interface 1124 include, but are not limited to, a serial port, a parallel connection, a USB port, a FIREWIRE port, a THUNDERBOLT port, and any combinations thereof.

In addition, or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 1100 shown in FIG. 11 such as, but not limited to, the network 1130, processor 1101, memory, 1103, etc., may comprise a cloud computing system. In one such system, front-end systems such as input devices 1133 may provide information to back-end platforms such as servers (e.g. computer systems 1100) and storage (e.g., memory 1103). Software (i.e., middleware) may enable interaction between the front-end and back-end systems, with the back-end system providing services and online network storage to multiple front-end clients. For example, a software-as-a-service (SAAS) model may implement such a cloud-computing system. In such a system users may operate software located on back-end servers through the use of a front-end software application such as, but not limited to, a web browser.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A video processing system comprising,
an end-user device displaying one or more sections of video, the one or more sections of video comprising one or more video objects;
one or more video object storing devices, wherein information related to the one or more video objects is located on the one or more video object storing devices;
one or more object classification devices, the one or more classification devices,
implementing a neural network to recognize and identify the one or more video objects, and utilizing an algorithm associated with a network structure to associate one or more AI tags with each of the one or more video objects; and
a communication control device processing communications between the end-user device, one or more video object storing devices, and one or more classification devices.

2. The video processing system of claim 1 wherein, the one or more video objects comprises at least one of,
a person,
an animal,
an activity,
a motion,
an object, and
an event.

3. The video processing system of claim 1 wherein,
the one or more object classification devices comprises a first object classification device and a second object classification device;
the first object classification device comprises a first algorithm and a first network structure; and
the second object classification device comprises a second algorithm and a second network structure, wherein, at least one of the second algorithm and the second network structure is different than the first algorithm and first network structure.

4. The video processing system of claim 3, wherein,
the first classification device associates one or more first AI tags with each of the one or more video objects;
the second classification device associates one or more second AI tags with each of the one or more video objects; and
at least one of the second AI tags is different than the first AI tags.

5. The video processing system of claim 4 wherein, the second classification device verifies the accuracy of the AI tags from the first verification device.

6. The video processing system of claim 5 wherein, the communication control device verifies the accuracy of the AI tags from the first verification device by comparing the AI tags from the second verification device with user-supplied metadata.

7. A method of identifying a video object comprising,
selecting at least one video object in at least one frame of a plurality of identified videos by using a pointing device to selectively identify the at least one video object;
using at least one of a first classification device and a second classification device to recognize the at least one video object, wherein,
the first classification device comprises a first neural network having,
a first network structure, and
a first algorithm,
the second classification device comprises a second neural network having,
a second network structure, and
a second algorithm;
associating the at least one recognized video object with at least one word, wherein, the at least one word is related to at least one feature of the at least one recognized video object;
using the at least one word to locate one or more additional video objects in the plurality of videos; and
associating metadata with the at least one video object after selecting the at least one video object by at least one of manually,
giving the object a name,
selecting a category for the object, and
typing keywords related to the object.

8. The method of claim 7 wherein, the second neural network is different than the first neural network.

9. The method of claim 7, wherein using a pointing device to selectively identify an object comprises using a computing mouse to create a box around the object.

10. A video object data storage and display system comprising,
a video object data selection portion comprising,
a video object scale,
a video object pose,
a video object location, wherein,
the video object scale, video object pose, and video object location:
comprise portions of a video object shape for a plurality of predetermined video frames, and
determine the shape, position, and orientation of a video object,
the video object shape comprises,
a major axis having a major axis length, and
a minor axis having a minor axis length
the video object position comprises a center-mass location, and
the video object orientation comprises an angle, and
a video object frame, wherein the video object frame comprises a time; and
a video object data storage portion comprising a database, wherein,
the database comprises a first vector,
the first vector comprises a plurality of first vector parameters, and
the plurality of first vector parameters comprise,
a first major axis length,
a first minor axis length,
a first center-mass location,
a first angle, and
a first time.

11. The video object data storage and display system of claim 10, wherein,
the database comprises a second vector, the second vector comprises a plurality of second vector parameters, the plurality of second vector parameters comprising,
a second major axis length,
a second minor axis length,
a second center-mass location,
a second angle, and
a second time; and
the database comprises a third vector, the third vector comprises a plurality of third vector parameters, the plurality of third vector parameters comprising,
a third major axis length,
a third minor axis length,
a third center-mass location,
a third angle; and
the third vector parameters are obtained by interpolating the first vector parameters and the second vector parameters for a given third time, wherein the third time is greater than the first time and less than the second time.

12. The video object data storage and display system of claim 11, wherein, one of a Linear Least Squares and a Linear Weighted Least Squares approach is used to obtain the third vector parameters.

13. The video object data storage and display system of claim 10, wherein,
   the center-mass location comprises a location of an intersection of the major axis and the minor axis; and
   the angle comprises a distance between the major axis and a reference axis.

14. The video object data storage and display system of claim 13 wherein,
   the reference axis comprises the x-axis;
   the frame comprises a value associated with an object clarity and an object pose;
and further comprising,
   at least one display device comprising,
      a video display portion, and
      a video object interaction portion.

* * * * *